United States Patent
Shiina et al.

(10) Patent No.: US 8,439,148 B2
(45) Date of Patent: May 14, 2013

(54) SUSPENSION-SUPPORTING BRACKET FOR A VEHICLE, VEHICLE BODY FRAME WITH SUSPENSION-SUPPORTING BRACKET, AND VEHICLE INCORPORATING SAME

(75) Inventors: Hiromitsu Shiina, Saitama (JP); Akihiro Yamashita, Saitama (JP); Hajime Uchiyama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 140 days.

(21) Appl. No.: 13/071,964

(22) Filed: Mar. 25, 2011

(65) Prior Publication Data
US 2011/0240397 A1 Oct. 6, 2011

(30) Foreign Application Priority Data
Mar. 31, 2010 (JP) ................................ 2010-083177

(51) Int. Cl.
| | | |
|---|---|---|
| *B62D 21/07* | (2006.01) | |
| *B62D 21/10* | (2006.01) | |
| *B62D 21/11* | (2006.01) | |
| *B60G 7/02* | (2006.01) | |
| *B60G 3/06* | (2006.01) | |

(52) U.S. Cl.
USPC ........... 180/312; 280/798; 280/792; 280/781; 280/788; 280/124.109; 296/204; 296/205; 296/203.02

(58) Field of Classification Search .................. 180/311, 180/312; 280/798, 792, 781, 788, 124.109, 280/124.15, 124.134; 296/203.01, 204, 205, 296/203.02, 203.03; *B62D 21/07, 21/10, B62D 21/11; B60G 7/02, 3/00, 3/02, 3/04, B60G 3/06*

See application file for complete search history.

(56) References Cited

U.S. PATENT DOCUMENTS

| | | | |
|---|---|---|---|
| 4,735,275 A * | 4/1988 | Tsukahara et al. | 180/215 |
| 5,870,809 A * | 2/1999 | Nishi | 29/281.5 |
| 7,306,069 B2 * | 12/2007 | Takeshima et al. | 180/312 |
| 7,434,822 B2 | 10/2008 | Takahashi et al. | |
| 7,735,903 B2 * | 6/2010 | Yamamura et al. | 296/187.12 |
| 7,950,493 B2 * | 5/2011 | Seki | 180/357 |
| 8,251,048 B2 * | 8/2012 | Kusa | 123/519 |
| 2001/0027890 A1 * | 10/2001 | Bria et al. | 180/291 |
| 2004/0207190 A1 * | 10/2004 | Nakagawa et al. | 280/781 |

FOREIGN PATENT DOCUMENTS
JP 4271641 B2 6/2009

* cited by examiner

*Primary Examiner* — Paul N Dickson
*Assistant Examiner* — Keith Frisby
(74) *Attorney, Agent, or Firm* — Carrier Blackman & Associates, P.C.; William D. Blackman; Joseph P. Carrier

(57) ABSTRACT

A vehicle includes a vehicle body frame, an engine attached to the vehicle body frame, and a power transmission unit for transmitting output from the engine to a wheel of the vehicle. The vehicle body frame includes a plate-shaped suspension-supporting bracket which is integrally connected to front end portions of main frame sections extending in a forward/rearward direction of a vehicle at a lower portion of the vehicle body frame, and also is integrally connected to lower end sides of front frame sections vertically extending at a front portion of the vehicle body frame. The plate-shaped suspension-supporting bracket includes suspension arm-supporting portions formed integrally therewith. The lightweight vehicle body frame reduces total weight of the vehicle and, at the same time, enhances assembling accuracy thereof.

20 Claims, 23 Drawing Sheets

FIG. 23
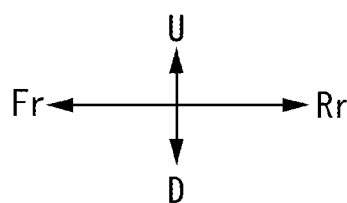
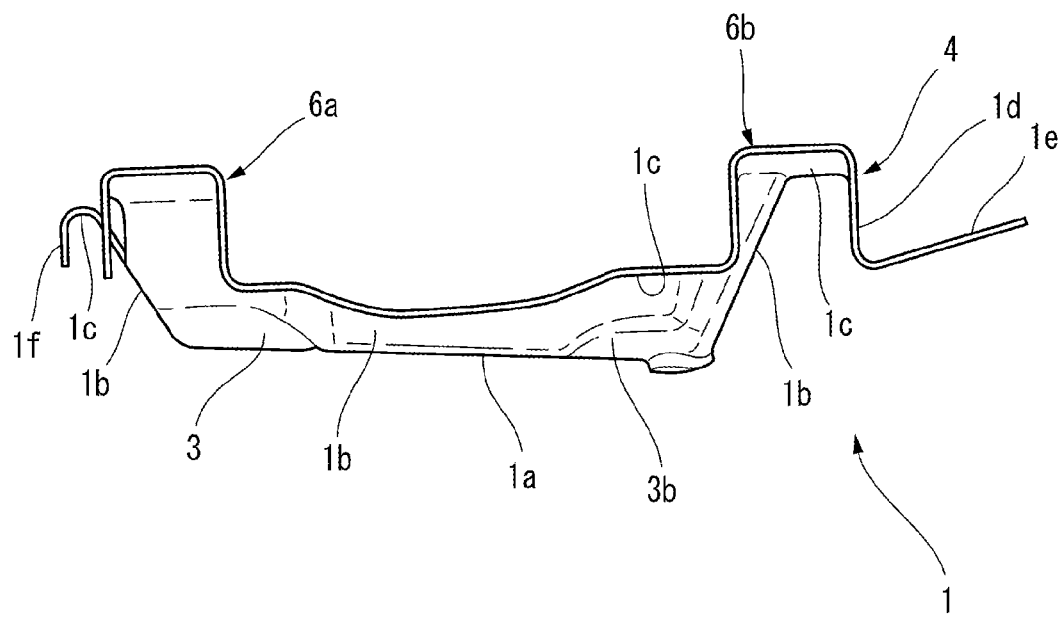

SUSPENSION-SUPPORTING BRACKET FOR A VEHICLE, VEHICLE BODY FRAME WITH SUSPENSION-SUPPORTING BRACKET, AND VEHICLE INCORPORATING SAME

CROSS-REFERENCE TO RELATED APPLICATIONS

The present invention claims priority under 35 USC 119 based on Japanese patent application No. 2010-083177, filed on Mar. 31, 2010. The entire subject matter of this priority document, including specification claims and drawings thereof, is incorporated by reference herein.

BACKGROUND OF THE INVENTION

1. Field of the Invention

The present invention relates to a suspension-supporting bracket, a vehicle body frame including the bracket, and to a vehicle incorporating the same. More particularly, the present invention relates to a vehicle body frame having a suspension-supporting bracket arranged between main and front frame sections thereof, and to an all-terrain vehicle incorporating the same.

2. Description of the Background Art

There is a known saddle-ride type vehicle suitable for rough terrain traveling, so-called All-terrain vehicle (ATV). Such vehicle has a structure which is equipped with balloon tires at front and rear portions of a vehicle body configured to be small-sized and weight-reduced. In this type of vehicle, for example, as shown in the Japanese Patent No. 4271641, a vehicle body frame is formed in a suitable loop structure by using several types of steel members such as left and right upper pipes, a lower pipe, etc. The steel members are joined with each other using a plurality of cross members so as to form a box structure, which is elongated in a forward/rearward direction at a center in the left/right direction of the vehicle body. By such structure, an engine, a power transmission unit (for transmitting engine drive force to wheels of a vehicle), etc., are configured so as to be capable of being suitably arranged.

As discussed above, in the vehicle shown in the Japanese Patent No. 4271641, several types of steel frame members such as the left and right upper pipes, the lower pipe, etc. are used to form a vehicle body frame. Such plural steel frame members lead to a tendency of weight-increase of the vehicle. Moreover, the steel frame members are formed in the suitable loop structure and are connected to several members through the plurality of cross members by welding Accordingly, there is a problem in that a manufacture process is complicated due to accuracy management for assembling of several frame members.

The present invention has been made to overcome the drawbacks of the existing vehicle body frame. Accordingly, it is one of the objects of the present invention to provide a vehicle having a vehicle body frame which allows weight-reduction of a vehicle body, and at the same time, enhances assembling accuracy of frame members thereof.

SUMMARY OF THE INVENTION

In order to achieve the above objects, the present invention according to a first aspect thereof provides a vehicle which includes a vehicle body frame, an engine attached to the vehicle frame body for generating power, and a power transmission unit for transmitting output produced in the engine to wheels of the vehicle. The vehicle body frame includes main frame sections extending in a forward/rearward direction of a lower portion of the vehicle body frame, front frame sections vertically extending at a vehicle body front portion of the vehicle body frame, and a suspension-supporting bracket having suspension arm-supporting portions. Left and right suspension arms of the vehicle are attached to the suspension arm-supporting portions. The suspension-supporting bracket includes a main plate member. A front suspension arm-supporting portion and a rear suspension arm-supporting portion are formed integrally with left and right sides of the main plate member and joined between forward end portions of the main frame sections and lower end portions of the front frame sections.

The present invention according a second aspect thereof, in addition to the first aspect, is characterized in that the suspension-supporting bracket is formed with a side wall portion which is formed on a forward/rearward side and a left/right side by a peripheral portion thereof rising up relative to a bottom wall portion thereof, and a flange portion bent outward of the bracket relative to a wall surface of the side wall portion is provided.

The present invention according to a third aspect thereof, in addition to one of the first and second aspects, is characterized in that the suspension arm-supporting portions are provided at left and right sides of a front end of the plate-shaped bracket and at left and right sides of a rear end of the bracket, and a forward/rearward concaved portion extending in a forward/rearward direction on a vehicle body center line and diagonally concaved portions extending along lines connecting, by diagonal lines, the suspension arm-supporting portions are configured so as to have concave shapes, as viewed in a bottom view of the bracket.

The present invention according to a fourth aspect thereof, in addition to the third aspect, is characterized in that the diagonally concaved portions are configured in such a manner that sizes of recesses thereof are gradually increased from a substantially center portion of the suspension-supporting bracket toward an outside of the bracket.

The present invention according to a fifth aspect thereof, in addition to one of the second through fourth aspects, is characterized in that the suspension-supporting bracket is joined to the front frame sections in such a manner that joined surfaces thereof with respect to the front frame sections astride the flange portion, the side wall portion, and the front suspension arm-supporting portion.

The present invention according to a sixth aspect thereof, in addition to one of the second through fifth aspects, is characterized in that the flange portion has a portion bent downwardly thereon at a front end thereof.

The present invention according to a seventh aspect thereof, in addition to one of the second through sixth aspects, is characterized in that the flange portion has a rear end bent portion bent downwardly at a rear end thereof, and a rearwardly-extending portion extending rearward from the rear end bent portion, said rearwardly-extending portion formed with a downward facing U-shaped portion which opens downward as viewed in a side view, and the rear suspension arm-supporting portion is provided so as to be continued to the downward facing U-shaped portion.

The present invention according to a eighth aspect thereof, in addition to the seventh aspect, is characterized in that forward end portions of the main frame sections pass the rearwardly-extending portion and the downward facing U-shaped portion from the rear end bent portion, extend to the side wall portion and are joined to the side wall portion.

ADVANTAGEOUS EFFECTS OF INVENTION

According to the vehicle as defined in the first aspect of the present invention, the suspension-supporting bracket includes the main plate member, so that weight-reduction can be realized for the vehicle body frame, and a desired space can be obtained forwardly of a vehicle body as compared to the conventional frame structure employing a plurality of pipe members. The vehicle frame body according to the present invention improves the degree of freedom in the layout of a vehicle structure and auxiliary components.

Moreover, the suspension-supporting bracket can be formed by press-working, so that the suspension arm-supporting portions can be formed at the time of the press-working. Accordingly, and the forming accuracy can be enhanced.

Moreover, the suspension-supporting bracket can be formed in such a manner that the front suspension arm-supporting portions and the rear suspension arm-supporting portions are formed with good accuracy by the press-working. Accordingly, positional tolerances of the respective suspension arm-supporting portions can be reduced. Also, adjustment of alignment of various components of the vehicle body frame is made easy.

According to the vehicle as defined the second aspect of the present invention, the rigidity of the plate-shaped suspension-supporting bracket can be ensured.

According to the vehicle as defined in the third aspect, the rigidity of the suspension-supporting bracket in the forward/rearward direction of the vehicle body with respect to load can be enhanced. Also, the rigidity can be enhanced with respect to lateral load which is applied through the suspension arm.

According to the vehicle as defined in the fourth aspect, it is possible to allow moderate deflection at a portion in vicinity of the center portion while ensuring the rigidity of the peripheral portion of the suspension-supporting bracket, and also while ensuring the support strength of the suspension arm, thereby enhancing the degree of selection freedom in setting ride comforts.

According to the vehicle as defined in the fifth aspect, the rigidity of the suspension arm-supporting portions is ensured with a cubic structure, joining areas between the suspension-supporting bracket and the front frame sections can be largely taken and the strength can be ensured.

According to the vehicle as defined in the sixth aspect, the rigidity of the forward side of the suspension-supporting bracket can be further enhanced. Also, the joining areas between the suspension-supporting bracket and the front frame sections can be more largely taken, and the strength of the vehicle body frame can be further enhanced.

According to the vehicle as defined in the seventh aspect, the rigidity of the rearward side of the suspension-supporting bracket is enhanced. Also, the rigidity of the rear suspension arm-supporting portions can be ensured.

According to the vehicle as defined in the eighth aspect, the joining areas between the suspension-supporting bracket and the main frame sections are ensured with strong joints. At the same time, the rear suspension arm-supporting portions to which the load of the suspension arm is mostly applied can be configured so as to be supported by the main frame sections. Also the rigidity of the vehicle body frame can be ensured.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 23 is a left side view of the suspension-supporting bracket, in the single component state, according to the present invention.

DETAILED DESCRIPTION OF ILLUSTRATIVE EMBODIMENTS

Figure 1:
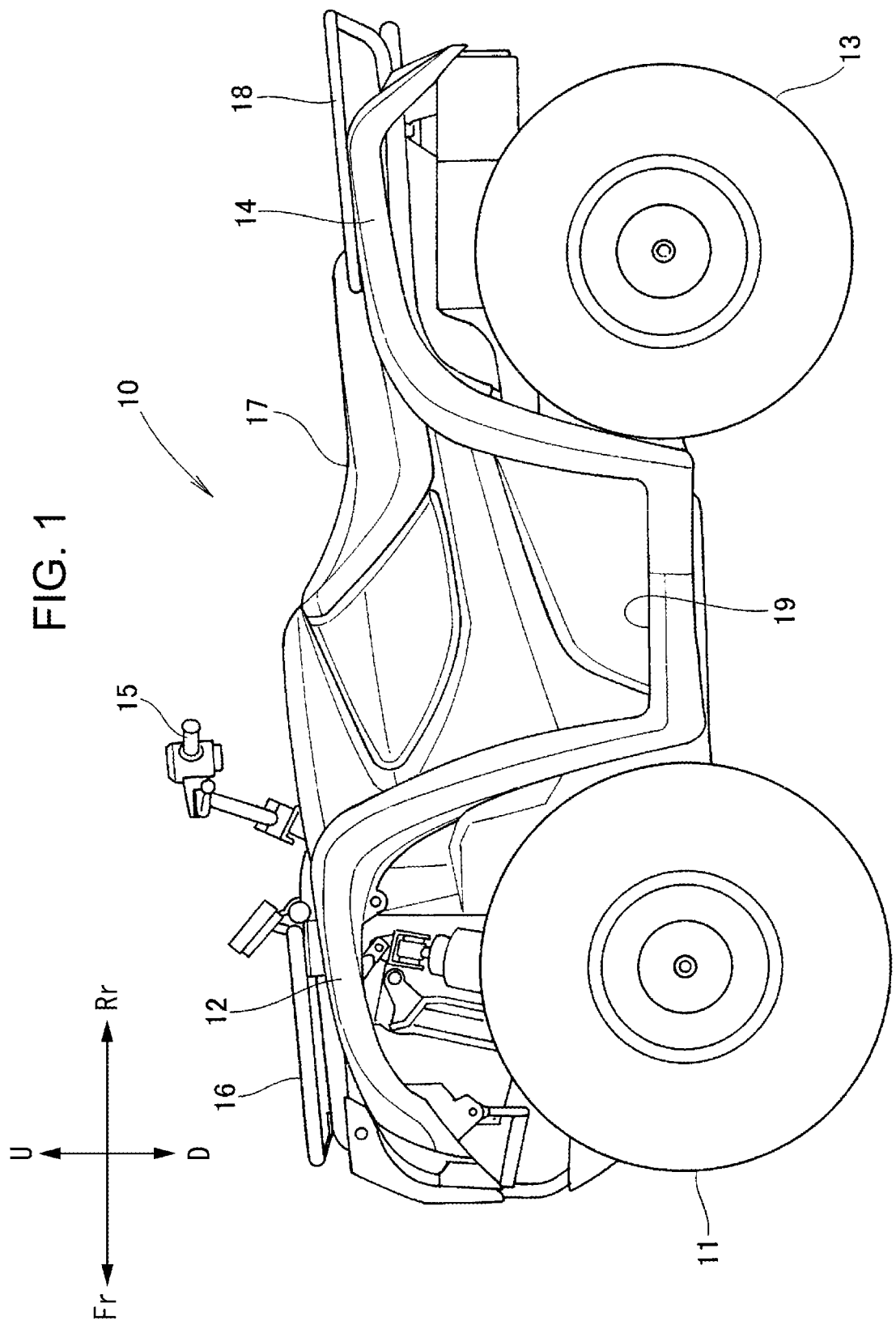
FIG. 1 is a left side view of a vehicle according to the present invention.

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

An illustrative embodiment of the present invention will be explained below in conjunction with accompanying FIGS. 1 to 23. Incidentally, left, right, upper, down, etc. shall be referred to while viewing the drawings according to the orientation of reference signs. Also, forward/rearward, left/right, and upward/downward directions of a vehicle shall be referred to according to a direction viewed from a rider. Specifically, in the drawings, the forward direction of the vehicle is indicated by FR, the rearward direction of the vehicle is indicated by RR, the left direction of the vehicle is indicated by L, the right direction of the vehicle is indicated by R, the upward direction of the vehicle is indicated by U, and the downward direction of the vehicle is indicated by D.

The illustrative embodiment of a saddle-ride type all-terrain vehicle (ATV) operable in a rough terrain conditions is explained below.

As shown in FIG. 1, the vehicle 10 includes a front wheel 11 provided at a lower portion of a front portion of the vehicle body, a front fender 12 arranged above the front wheel 11, a rear wheel 13 arranged at a lower portion of a rear portion of the vehicle body, a rear fender 14 arranged above the rear wheel 13, a steering handlebar 15 disposed above the front wheel 11, a front cargo bed 16 arranged in the front of the steering handlebar 15, and a seat 17 and a rear cargo bed 18 disposed behind the steering handlebar 15.

Figure 2:
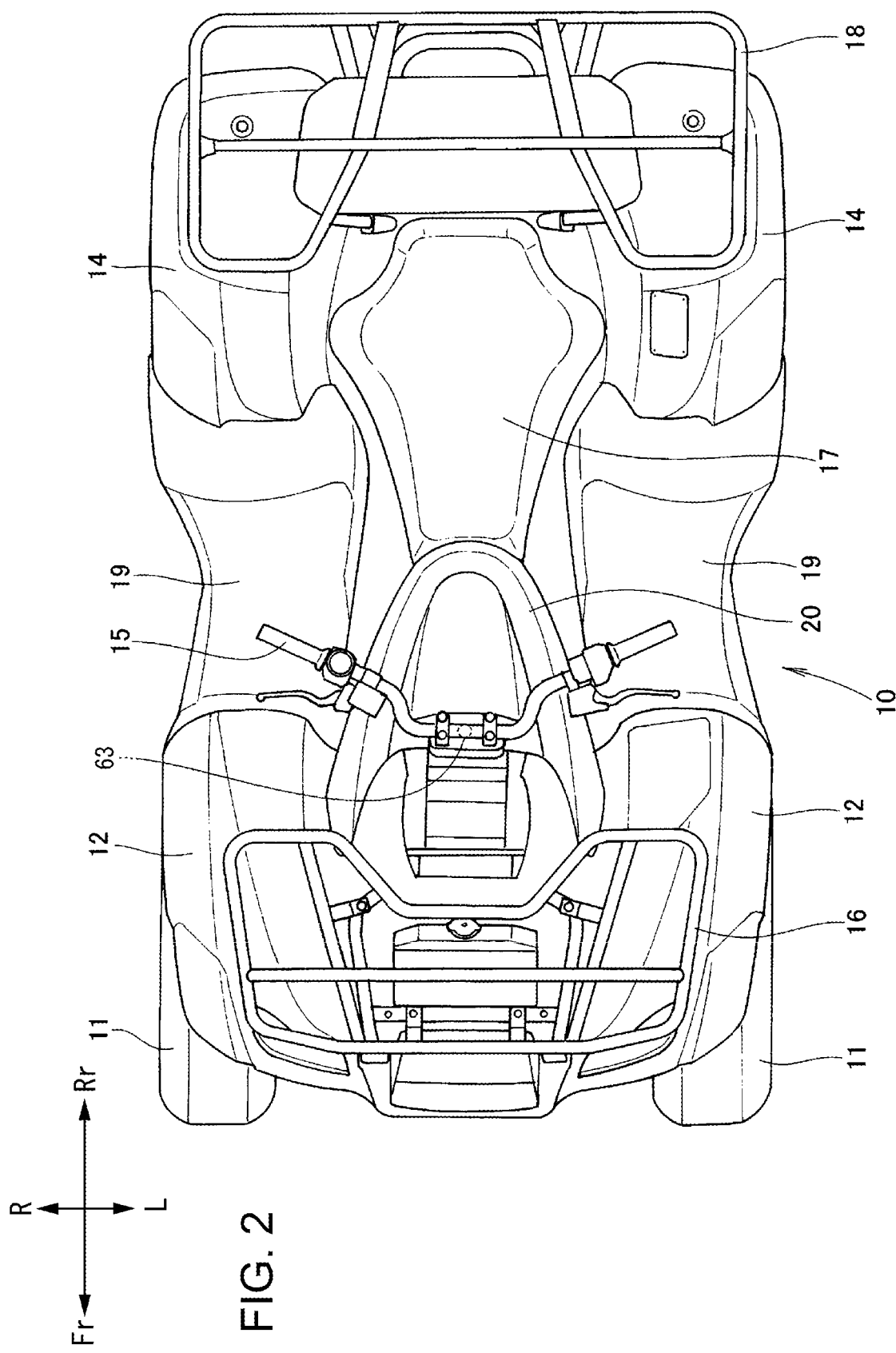
FIG. 2 is a top plan view of the vehicle according to the present invention.

As shown in FIG. 2, the vehicle 10 further includes left and right step floors 19, 19 disposed between the steering handlebar 15 and the seat 17. The vehicle 10 is configured as a vehicle for saddle-riding in which the rider sitting on the seat 17 can put his/her feet on the step floors 19, 19. Further, the vehicle 10 includes a front cover 20 arranged between a steering shaft 63 and the seat 17. The front cover is configured to cover an air cleaner 23 (FIG. 3).

Figure 3:
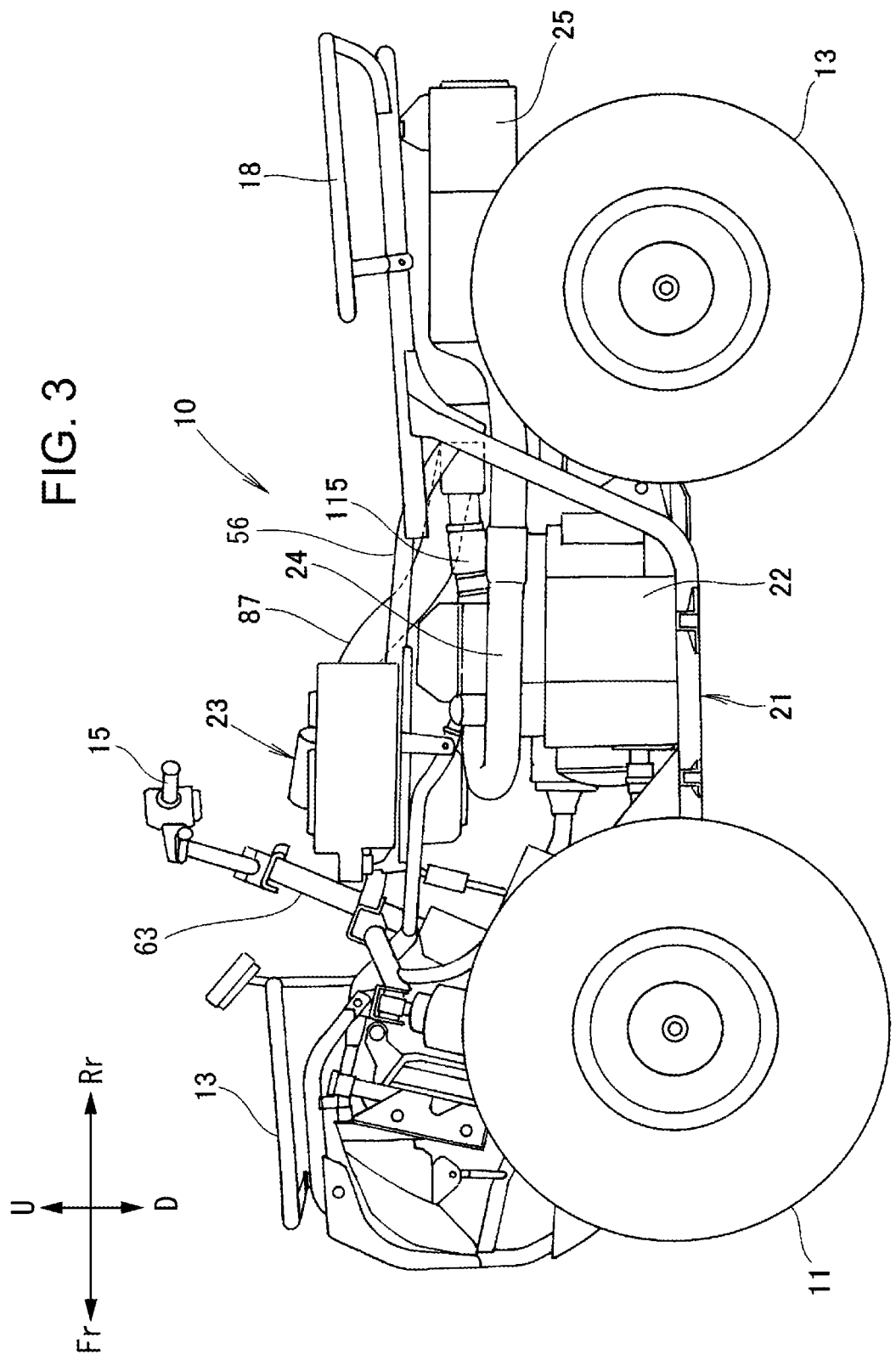
FIG. 3 is a left side view of the vehicle with a vehicle body cover being removed therefrom according to the present invention.

As shown in FIG. 3, depicting the vehicle with a vehicle body cover being removed therefrom, the vehicle 10 is supported by a vehicle body frame 21 configured by connecting various frame members, which will be discussed below.

An engine 22 (for example, as an internal combustion gasoline engine), and an air cleaner 23 are arranged at a center of the vehicle body frame 21 on an upper frame section 56 of the vehicle body frame 21. Air which is sucked by the air cleaner 23 is led via a connecting tube 87 into a throttle body 115, and mixed with fuel to be combusted by the engine 22. Exhaust gas from the engine is discharged outward through an exhaust pie 24 extending from the engine 22. A muffler 25 connected to a rear end of the exhaust pipe 24.

Rotary power generated by the engine 22 is transmitted to the front wheel 11 rotatably attached to a lower portion of a front portion of the vehicle body frame 21, and/or to the rear wheel 13 rotatably attached to a lower portion of a rear portion of the vehicle body frame 21. It is possible to steer the wheels by the steering shaft 63 rotatably attached to an upper portion of the front portion of the vehicle body frame 21, and the steering handlebar 15 rotating the steering shaft 63.

If the front wheel 11 and the rear wheel 13 are wide, and low-pressure special-tires which are called balloon tires, convex and concave of a road surface is cancelled by deformation of the low-pressure tires. Also, even if the road surface is soft, sinking can be inhibited by the wide tires, so that the vehicle 10 has the structure suitable as an ATV.

While the case where the engine 22 is the gasoline engine in the illustrative embodiment has been explained, the present invention is not limited to this, and as long as it is a drive source such as a diesel engine, an electric motor, etc., the type of engine is not objected.

Figure 4:
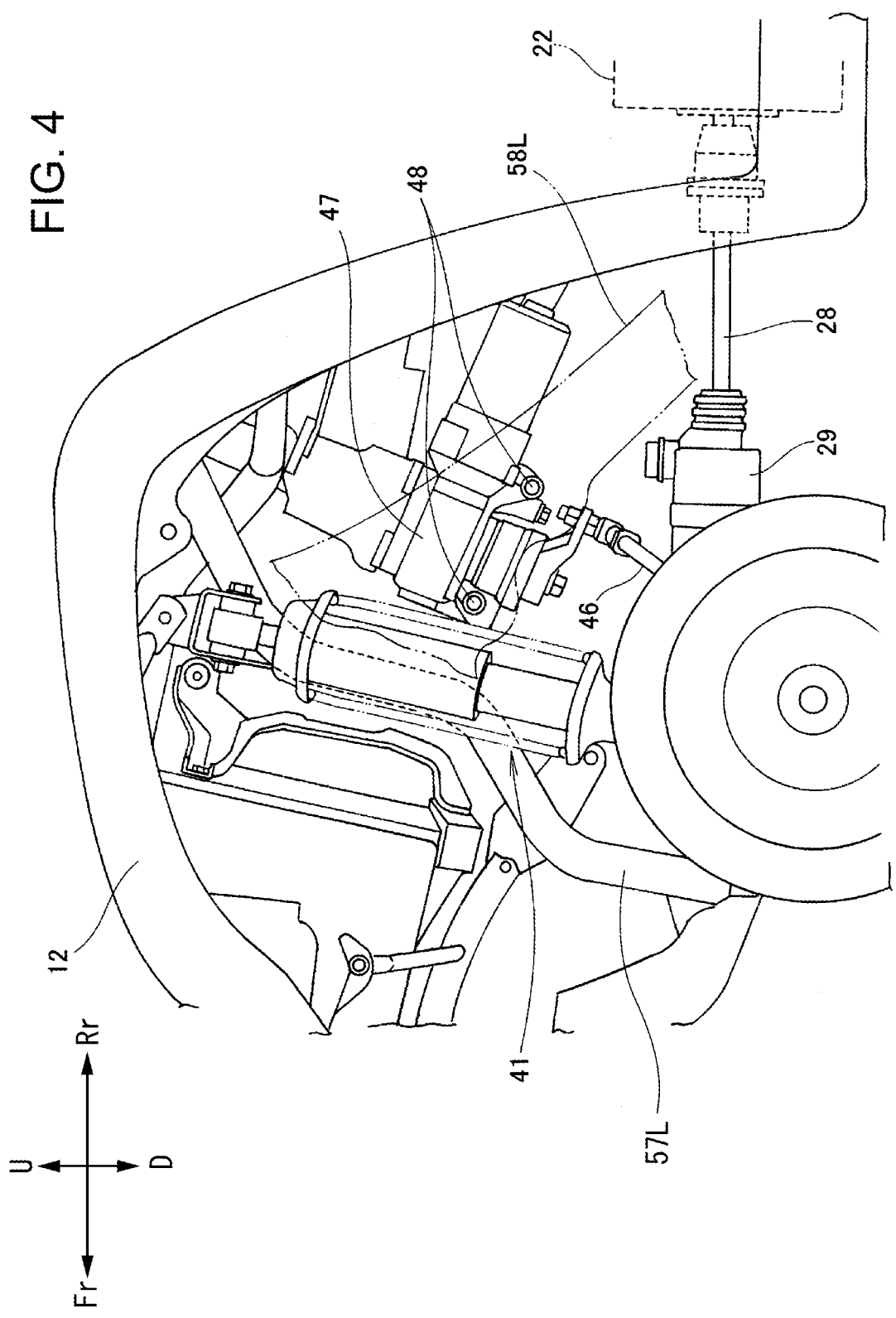
FIG. 4 is a side view for explaining a suspension system for a front wheel.

The power generated in the engine 22 is transmitted to a final reduction gear 29 by a power transmission unit 28 such as a propeller shaft, etc., as shown in FIG. 4.

Figure 5:
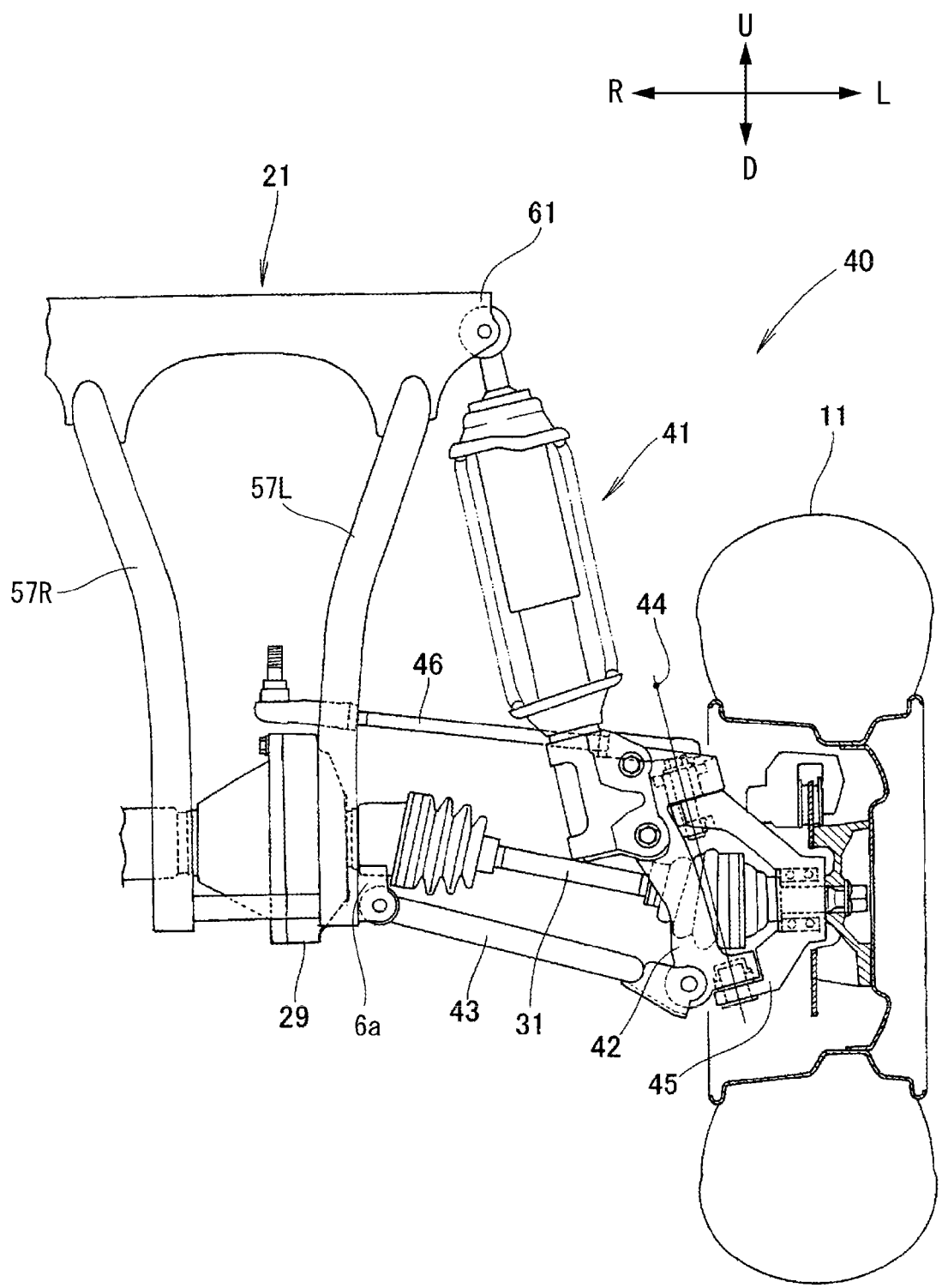
FIG. 5 is a front view for explaining the suspension system for the front wheel.

As shown in FIG. 5, the power is then transmitted to the front wheel 11 through a drive shaft 31 which extends in a vehicle width direction from the final reduction gear 29, and the front wheel 11 is rotation-driven.

Further, as shown in FIG. 5, a front wheel suspension system 40 includes a front shock absorber 41 connected at an upper end thereof to the vehicle body frame 21 and extending downward, a knuckle supporting member 42 extending downward from a lower portion of the front shock absorber 41, a suspension arm 43 extending in the vehicle width direction and linking a lower portion of the knuckle supporting member 42 to the vehicle body frame 21, a knuckle 45 rotatably attached around a kingpin shaft 44 with respect to the knuckle supporting member 42 and supporting the front wheel 11, and a tie rod 46 extending in the vehicle width direction and rotating the knuckle 45 around the kingpin shaft 44.

As shown in FIG. 4, the tie rod 46 is linked to an output shaft of a power steering unit 47. The power steering unit 47 is fastened by bolts 48, 48 to a front tension bracket 58L which is shown by an imaginary line.

Figure 6:
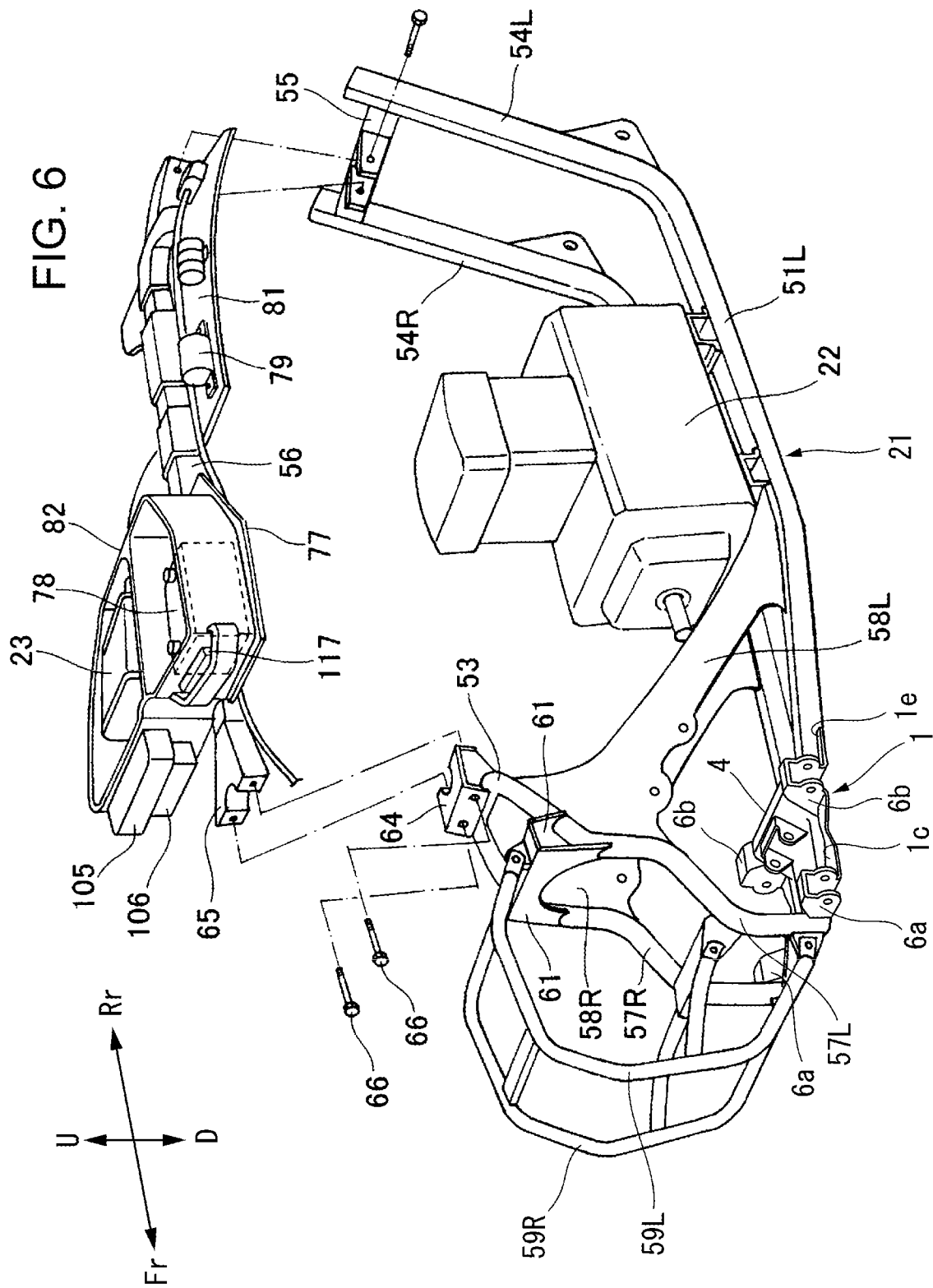
FIG. 6 is an exploded perspective view of a vehicle body frame according to the present invention.

In the vehicle body frame 21, as shown in FIG. 6, the upper frame section 56 may be removed from a first cross portion 53 and a second cross portion 55. Thus, when an in-vehicle component, such as the engine 22, etc. is carried, if the upper frame section 56 is removed, it is possible to lower the in-vehicle component, which is a heavy component, into the vehicle body frame 21 from the upper side.

Moreover, an auxiliary component supporting portion 77 supporting auxiliary components, such as the air cleaner 23, a battery 78, etc., and an electric equipment-supporting portion 81 supporting electric equipments, such as an ignition coil 79, etc., are attached to the upper frame section 56. Sub-assembling of the frame is made possible by collective arrangement of the auxiliary components, the electric equipments, etc.

Further, by removing the upper frame section 56, it is possible to remove the auxiliary components, the electric equipments, etc. together from the vehicle body frame 21, and maintenance and inspection are easily performed.

The structure of the vehicle body frame 21 will be explained in detail hereinafter.

Figure 7:
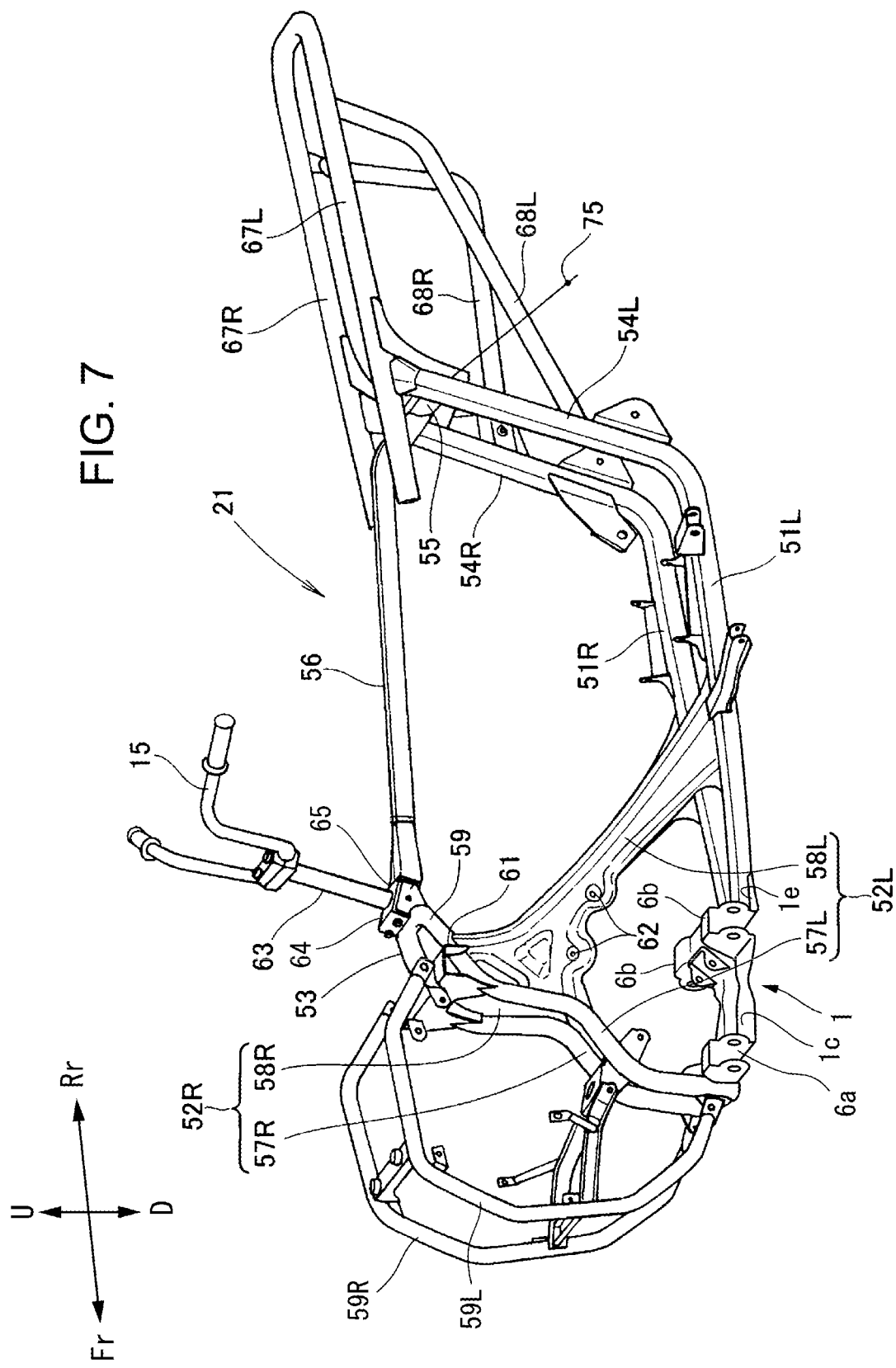
FIG. 7 is a perspective view of the vehicle body frame according to the present invention.

As shown in FIG. 7, the vehicle body frame 21 includes, as main elements thereof, a pair of left and right main frame sections 51L, 51R (in reference signs, L is an accompanying letter indicating the left as viewed from the rider, and R is an accompanying letter indicating the right; they are indicated hereinafter in the same manner), front frame sections 57L, 57R, and a plate-shaped suspension-supporting bracket 1. The main frame sections 51L, 51R are arranged in the forward/rearward direction of the vehicle under the engine 22 (FIG. 6) and are bent at rear portions thereof upward. Left and right front-wheel-suspension-supporting portions 52L, 52R are formed of pipes or frame sections extending upward from front portions of the main frame sections 51L, 51R. The left and right front-wheel-suspension-supporting portions 52L, 52R support the front wheel suspension system 40 (FIG. 5).

Further, the vehicle body frame 21 includes the first cross portion 53 bridged from the left front-wheel-suspension-supporting portion 52L to the right front-wheel-suspension-supporting portion 52R in the vehicle width direction, the second cross portion 55 bridged from a curved portion 54L of a rear portion of the left main frame 51L to a curved portion 54R of a rear portion of the right main frame 51R in the vehicle width direction. The upper frame section 56 is arranged in the forward/rearward direction of the vehicle above the engine 22, removably attached at a front end thereof to the first cross portion 53, and removably attached at a rear end thereof to the second cross portion 55.

The plate-shaped suspension-supporting bracket 1 is integrally connected to forward end portion of the left and right main frame sections 51L, 51R, and to the left and right front frames 57L, 57R.

The characteristic structure of the vehicle 10 in the illustrative embodiment resides in the provision of the suspension-supporting bracket 1 configured as the main plate member.

Namely, the suspension-supporting bracket 1 is connected to the forward end portions of the main frame sections 51L, 51R extending in longitudinal direction of the vehicle body frame 21, and lower end sides of the front frame sections 57L, 57R extending upwardly, in a substantially vertical direction, at a vehicle body front portion of the vehicle body frame 21.

Moreover, suspension arm-supporting portions 6a, 6b to which a suspension arm 43 is attached (refer to FIGS. 10, 11, and 12) are integrally formed on the left and right sides of the suspension-supporting bracket 1 in the vehicle body.

The structure in which the suspension-supporting bracket 1 includes the main plate member in this way correspondingly makes it possible to achieve weight-reduction, as compared to the conventional steel pipe member. Moreover, since the structure is configured such that a thickness in the vertical direction is small as compared to the conventional frame structure employing the pipe members, a space can be obtained in a front end of the vehicle body frame, and the degree of freedom in the layout of the vehicle structure and the auxiliary components is improved.

Moreover, since the suspension-supporting bracket 1 can be formed by press-working, the front/rear and left/right suspension-arm-supporting portions 6a, 6b can be formed at the time of the press-working. Therefore, the accuracy of their forming positions can be enhanced.

The upper frame section 56 is bending-formed in such a manner that a rear portion thereof faces downward and becomes oblique. Moreover, the front wheel suspension-supporting portion 52L includes the front frame 57L extending upward from the main frame 51L, and a front tension bracket portion 58L obliquely bridged across the upper portion of the front frame 57L and the main frame 51L and reinforcing the front frame 57L. The front wheel suspension-supporting portion 52R also includes the front frame 57R and a front tension bracket portion 58R.

Bolt holes 62, 62 which are used at the time of fastening a power steering unit 47 (refer to FIG. 4) to the front tension bracket portion 58L are formed in the front tension bracket portion 58L. The front wheel suspension-supporting portion 52R is also formed with similar bolt holes 62, 62 and forms a structure for supporting the power steering unit 47.

The pair of left and right front frame sections 57L, 57R are interconnected at upper ends thereof by the first cross portion 53. The first cross portion 53 is formed of a U-shaped pipe portion 59 which opens downward as viewed from the vehicle forward direction. The U-shaped pipe portion 59 is continued to the left and right front frame sections 57L, 57R, and the left and right front frame sections 57L, 57R. The U-shaped pipe portion 59 is formed of a single bent pipe. The front frame sections 57L, 57R are fixed at the lower ends thereof to the suspension-supporting bracket 1, as will be discussed hereinafter.

The pair of left and right front frame sections 57L, 57R and the U-shaped pipe portion 59 are formed of the single bent pipe, whereby the number of the components of the front wheel suspension-supporting portions 52L, 52R is reduced.

The front sub-pipes 59L, 59R are attached to the forward sides of the front frame sections 57L, 57R.

Moreover, front shock absorber attaching portions 61 are provided at the front frame sections 57L, 57R. The front shock absorber 41 is attached to the front shock absorber attaching portions 61, 61 (FIG. 5).

The front shock absorber attaching portions 61 are provided in vicinity of the first cross portion 53, whereby force from the front shock absorber 41 is smoothly transmitted to the vehicle body frame 21 through the first cross portion 53.

Moreover, the steering shaft 63 which extends downward from the steering handlebar 15 is supported movably by a front side steering shaft bearing portion 64 and a rear side steering bearing portion 65 (FIG. 6). The front side steering shaft bearing portion 64 is provided at the first cross portion 53, and the rear side steering shaft bearing portion 65 is provided at the tip end of the upper frame section 56.

The rear side steering shaft bearing portion 65 is aligned with the front side steering shaft bearing portion 64 in the forward/rearward direction of the vehicle and joined to it by bolts 66, 66, whereby a bearing structure is configured.

Namely, by appropriately utilizing the first cross portion 53 and the tip end of the upper frame section 56, the steering shaft 63 (FIG. 7) can easily be supported with the less number of parts.

Moreover, as shown in FIG. 7, rear pipes 67L, 67R extend in the rearward direction of the vehicle from the upper ends of the curved portions 54L, 54R of the left and right main frame sections 51L, 51R. The rear pipes 67L, 67R are reinforced by rear sub-pipes 68L, 68R which are extended from centers of the curved portions 54L, 54R in a height direction of the curved portions 54L, 54R.

The tip ends of the rear pipes 67L, 67R, when viewed in the side view of the vehicle, are extended in the forward direction of the vehicle from the rear end of the upper frame section 56. Namely, the tip ends of the rear pipes 67L, 67R, when viewed in the side view of the vehicle, are overlapped on the rear end of the upper frame section 56.

Figure 8:
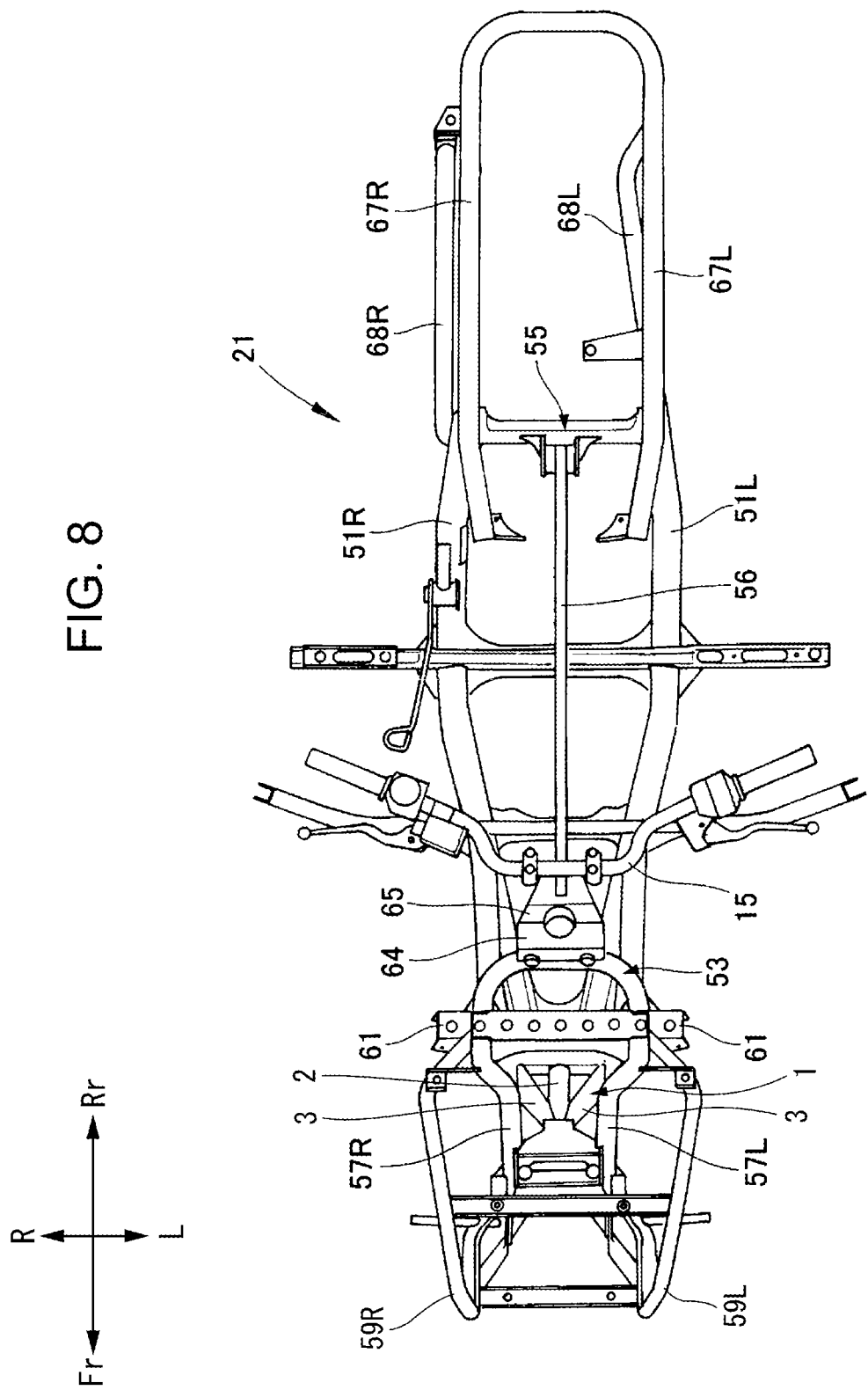
FIG. 8 is a top plan view of the vehicle body frame according to the present invention.

As shown in FIG. 8 which is the plan view of the vehicle body frame 21, the single upper frame section 56 is provided on a center line of the vehicle body. While two left and right upper frame sections 56 may be bridged across the first cross portion 53 and the second cross portion 55, in the case of the single upper frame section, the weight-reduction of the vehicle body frame 21 is made possible, easy attachment and detachment are allowed. Also, the time of the work of assembling, etc. is reduced.

Figure 9:
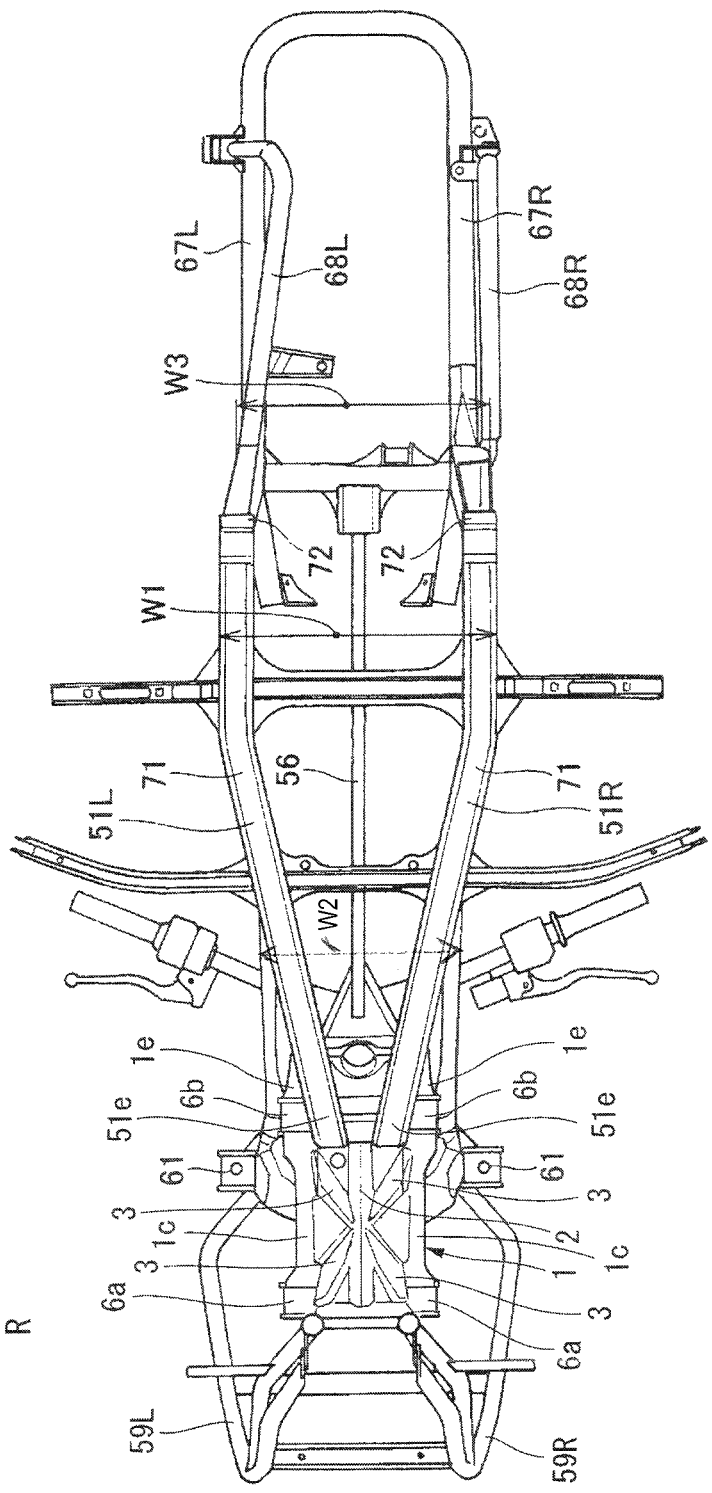
FIG. 9 is a bottom view of the vehicle body frame according to the present invention.

Moreover, as shown in FIG. 9, which is the bottom view of the vehicle body frame 21 (the accompanying letters L and R become reverse), a front bent portion 71 and a rear bent portion 72 are provided at the left and right main frame sections 51L, 51R in such a manner that, regarding an interval (outer width) between the left and right main frame sections 51L, 51R in the vehicle width, a center portion is W1, whereas a front interval W2 and rear interval W3 each become narrower than the center portion, so as to be W2 (W2<W1) and W3 (W3<W1), respectively.

The front interval is made narrower, whereby adjustment of alignment is made easy. Also, the rear interval is made narrower, whereby riding habitability is easily ensured in the saddle-ride type vehicle.

Figure 10:
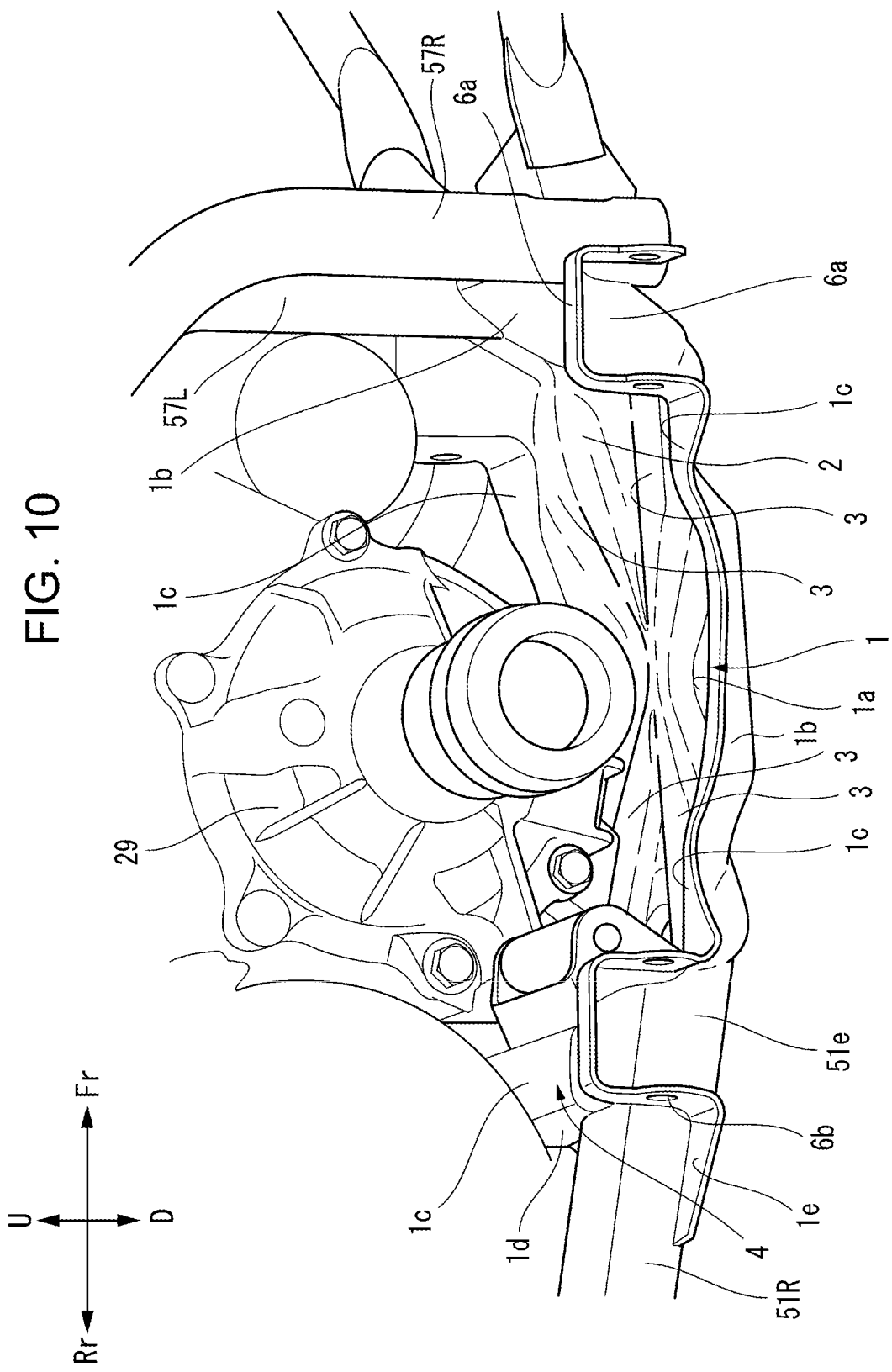
FIG. 10 is an enlarged perspective view of a suspension-supporting bracket of the vehicle body frame according to the present invention.
Figure 11:
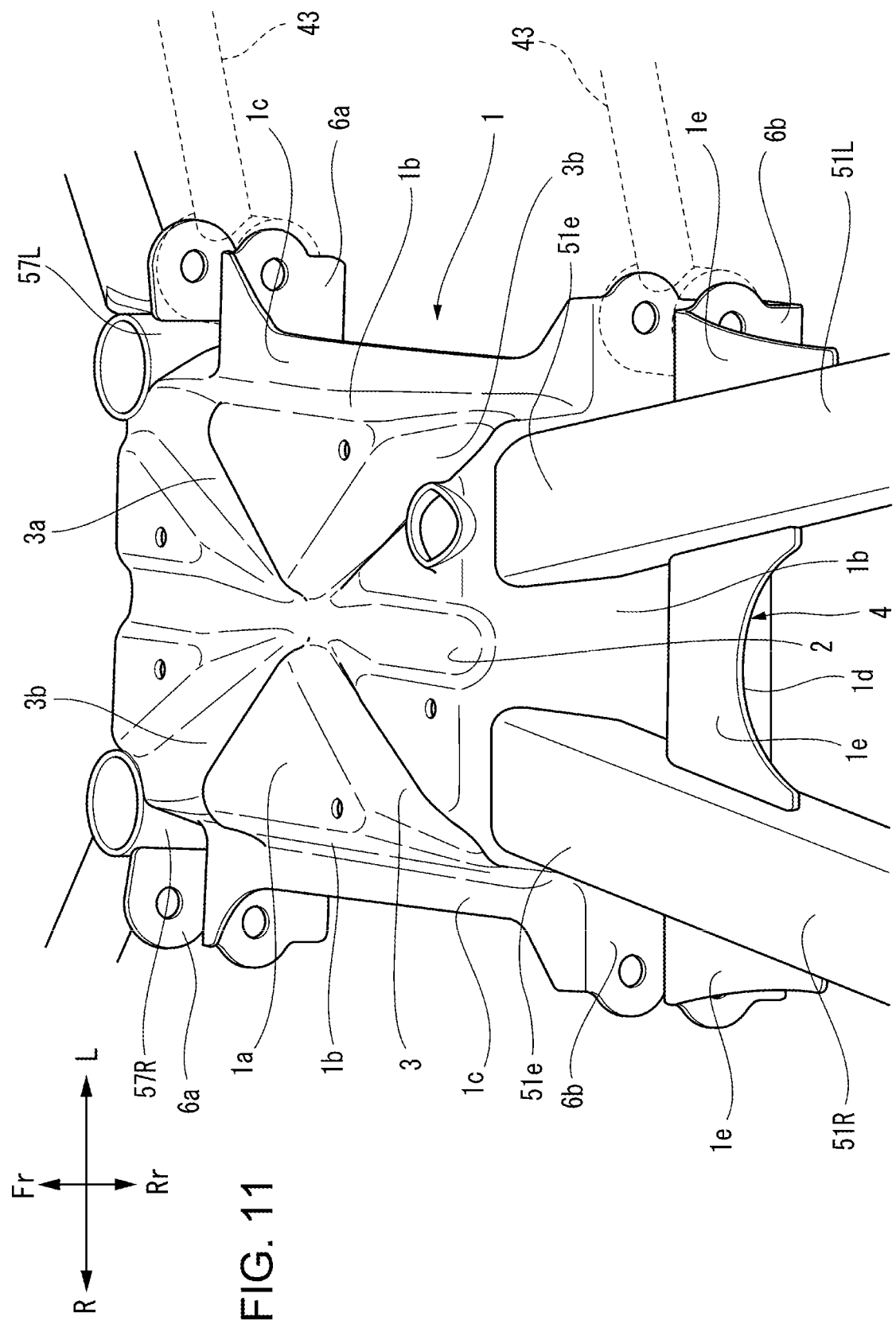
FIG. 11 is an enlarged perspective view of a rearward side of a back surface of the suspension-supporting bracket of FIG. 10.
Figure 12:
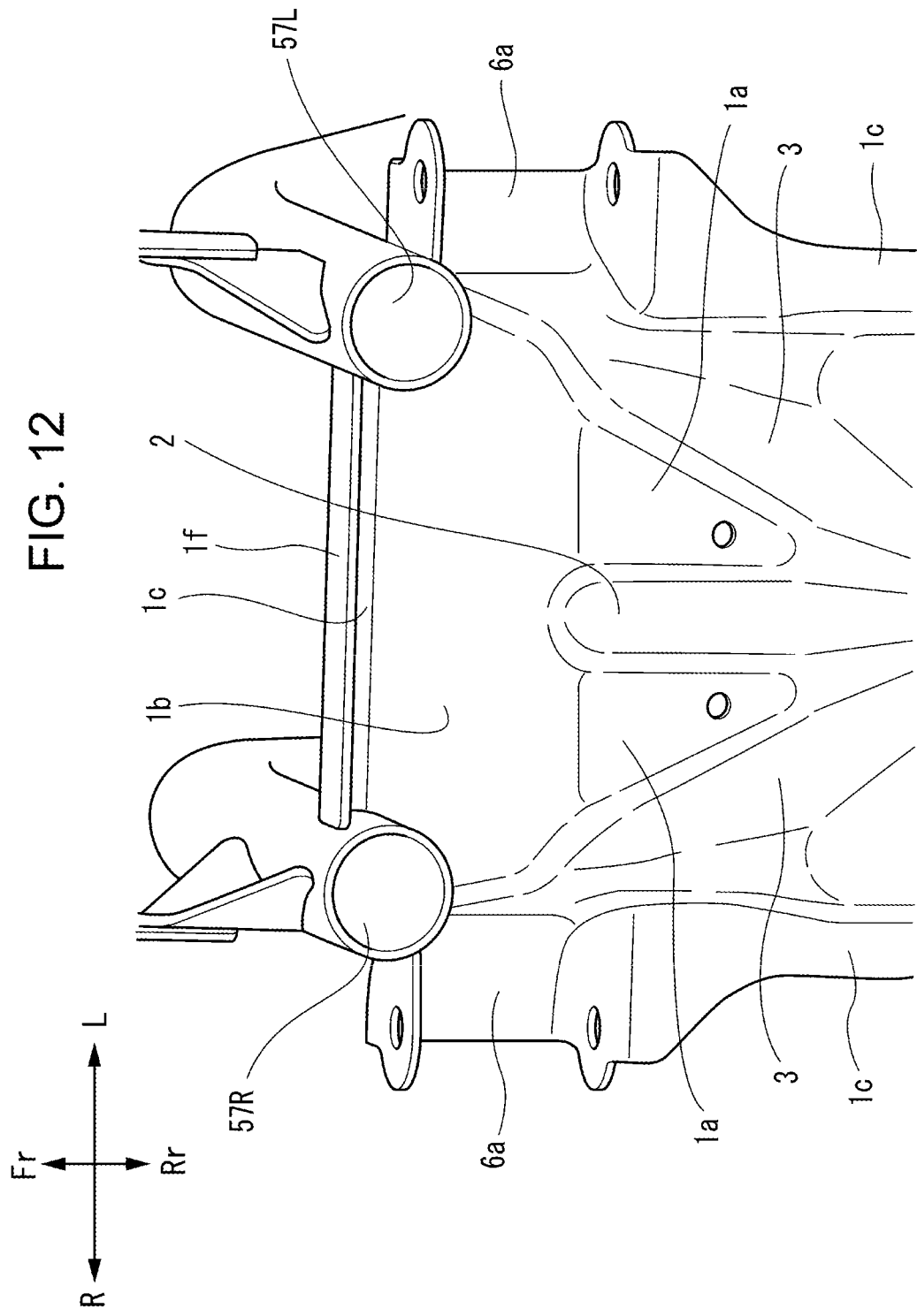
FIG. 12 is an enlarged perspective view of a forward side of the back surface of the suspension-supporting bracket of FIG. 11.

In the illustrative embodiment, as shown in FIGS. 10-12 (FIGS. 10-12 show the installed state into the vehicle body frame) and FIGS. 20-23 (FIGS. 20-23 show the single parts prior to being installed into the vehicle body frame), the suspension arm-supporting portions in the suspension-supporting bracket 1 are configured so as to comprise the pair of front suspension arm-supporting portion 6a and rear suspension arm-supporting portion 6b for each of the left and right sides of the vehicle.

The suspension-supporting bracket 1 is formed as a whole by the press-working in such a state as shown in FIGS. 20-23. Therefore, positional tolerances of the respective suspension arm-supporting portions 6a, 6b can be reduced, and also the adjustment of alignment is made easy at the time of assembling the vehicle 10.

In the illustrative embodiment, as shown in FIG. 10 (also refer to FIGS. 20-23), the suspension-supporting bracket 1 is formed with a side wall portion 1b which rises up at a peripheral portion of the suspension-supporting bracket 1 with respect to a bottom wall portion 1a. Moreover, a flange portion 1c which is curved outward of the bracket in a direction substantially extending along the bottom wall portion 1a with respect to a wall surface of the side wall portion 1b is provided. Since the suspension-supporting bracket 1 is the main plate member but its peripheral portion is configured such that it is bent so as to rise up and is further curved, the rigidity of the suspension-supporting bracket 1 can be enhanced.

In the illustrative embodiment, as shown in FIGS. 9 and 11 (also refer to FIGS. 20-23), the suspension arm-supporting portions 6a, 6b are provided at the left and right front ends and left and right rear ends of the bracket. Moreover, a forward/rearward concaved portion 2 extending in the forward/rearward direction on the center line of the vehicle body, and diagonally oriented concaved portions 3, 3 extending along lines which connect the front suspension arm-supporting portion 6a and the rear suspension arm-supporting portion 6b by diagonal lines, when viewed from the back surface side of the bracket, are provided at the bottom wall portion 1a.

A curved structure which is formed at the bottom wall portion 1a by the concaved portions in this way, whereby the rigidity of the suspension-supporting bracket 1 in the forward/rearward direction of the vehicle body with respect to load can be enhanced and the rigidity can be enhanced with respect to lateral load which is applied through the suspension arm 43.

In the illustrative embodiment, the diagonally concaved portions 3, 3 are configured such that sizes of the recesses becomes gradually larger from a substantially center portion of the suspension-supporting bracket 1 (a portion in which the concaved portions are crossed) toward the outward side of the bracket. Therefore, it is a strength-enhanced structure which allows moderate deflection at a portion in vicinity of the center portion while ensuring the rigidity of the peripheral portion of the suspension-supporting bracket 1 and ensuring the support strength of the suspension arm 43, and in which ride comfort is also taken into consideration.

In the illustrative embodiment, as shown in FIGS. 10 and 12, the front frame sections 57L, 57R are joined to the suspension-supporting bracket 1 in such a manner that they astride the flange portion 1c, the side wall portion 1b, and the front suspension arm-supporting portions 6a, 6a. By such a structure, the joining areas between the suspension-supporting bracket 1 and the front frame sections 57L, 57R can be largely taken and the strength can be ensured.

In the illustrative embodiment, as shown in FIG. 12, the flange portion 1c includes a front end bent portion if which is bent at its front end downward of the vehicle. Such structure of the suspension-supporting bracket makes it possible to further enhance the rigidity of the front side of the suspension-supporting bracket 1. At the same time, to take more lager joining areas between the suspension-supporting bracket and the front frame sections 57L, 57R, thus enhancing the strength.

In the illustrative embodiment, as shown FIG. 10 (also refer to FIGS. 20-23), the flange portion 1c includes a rear end bent portion 1d which is bent at its rear end downward of the vehicle, and a rearwardly-extending portion 1e extending rearward from the rear end bent portion 1d.

Therefore, a downward facing U-shaped portion 4 which opens downward, as viewed in the side view, is formed. Also, a structure in which the rear suspension arm-supporting portions 6b, 6b are provided so as to be continued to the downward facing U-shaped portion 4 is provided. According to such structure, the rigidity of the rear side of the suspension-supporting bracket 1 can be further enhanced. Also, the rigidity of the rear suspension arm-supporting portions 6b, 6b can be ensured.

In the illustrative embodiment, as shown in FIG. 10 (also refer to FIGS. 20-23), the flange portion 1c includes the rear end bent portion 1d which is bent at its rear end downward of the vehicle. The rearwardly-extending portion 1e extending rearward from the rear end bent portion 1d, the downward facing U-shaped portion 4 opening downward as viewed in the side view is formed. The rear suspension arm-supporting portions 6b, 6b are provided at the downward facing U-shaped portion 4. The front end portions 51e, 51e of the main frame sections 51L, 51R pass from the rear end bent portion 1d to the rearwardly-extending portion 1e and the downward facing U-shaped portion 4, extend to the side wall portion, and are joined to it.

This structure can be configured such that the joining areas between the suspension-supporting bracket 1 and the main frame sections 51L, 51R are ensured and a strong joining is made. At the same time, the rear suspension arm-supporting portions 6b, 6b are substantially supported by the main frame sections 51L, 51R. The load of the suspension arm 43 is mostly applied to the rear suspension arm-supporting portions 6b, 6b.

Next, attaching manner of a rear shock absorber will be explained.

Figure 13:
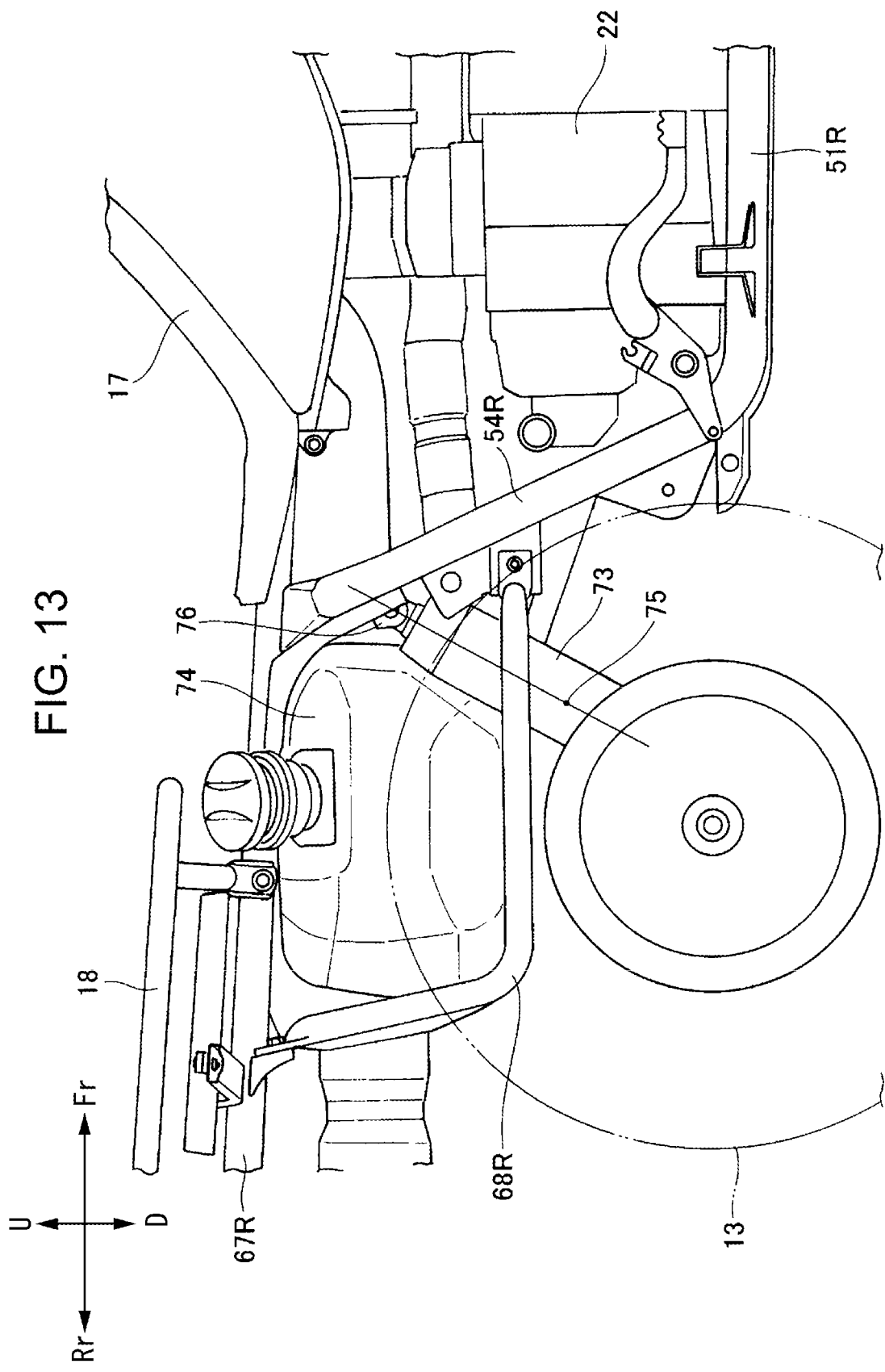
FIG. 13 is a right side view of a vehicle rear portion according to the present invention.

As shown in FIG. 13, the rear shock absorber 73 is attached at an upper portion thereof to a rear shock absorber attaching portion 76. The rear shock absorber attaching portion 76 is provided at the second cross portion 55 (FIG. 9).

Such a rear shock absorber 73 is obliquely arranged in such a manner that a lower portion thereof is position in the vehicle rearward direction (in the Figure, the right is the vehicle forward direction) relative to the upper portion thereof so as to allow the rear shock absorber to pass in the vehicle forward direction of a fuel tank 74.

Incidentally, as shown in FIG. 7, a rear shock absorber shaft 75 is confirmable to the shape of the rear bent portion of the upper frame section 56. Thereupon, the load of the rear shock absorber 73 which is applied to in an orientation of the rear shock absorber shaft 75 is smoothly transmitted to and bore by the upper frame section 56.

Moreover, the upper portions (the first cross portion 53) of the front frame sections 57L, 57R are bending-formed in such a manner that upper regions thereof are positioned in the vehicle rearward direction relative to lower regions thereof, so that the load of the front shock absorber 41 which is applied from the front shock absorber attaching portion 61 is smoothly transmitted to and bore by the upper frame section 56.

Next, the arrangement of the auxiliary components and the electric equipments which are carried on the upper frame section 56 will be explained.

Figure 14:
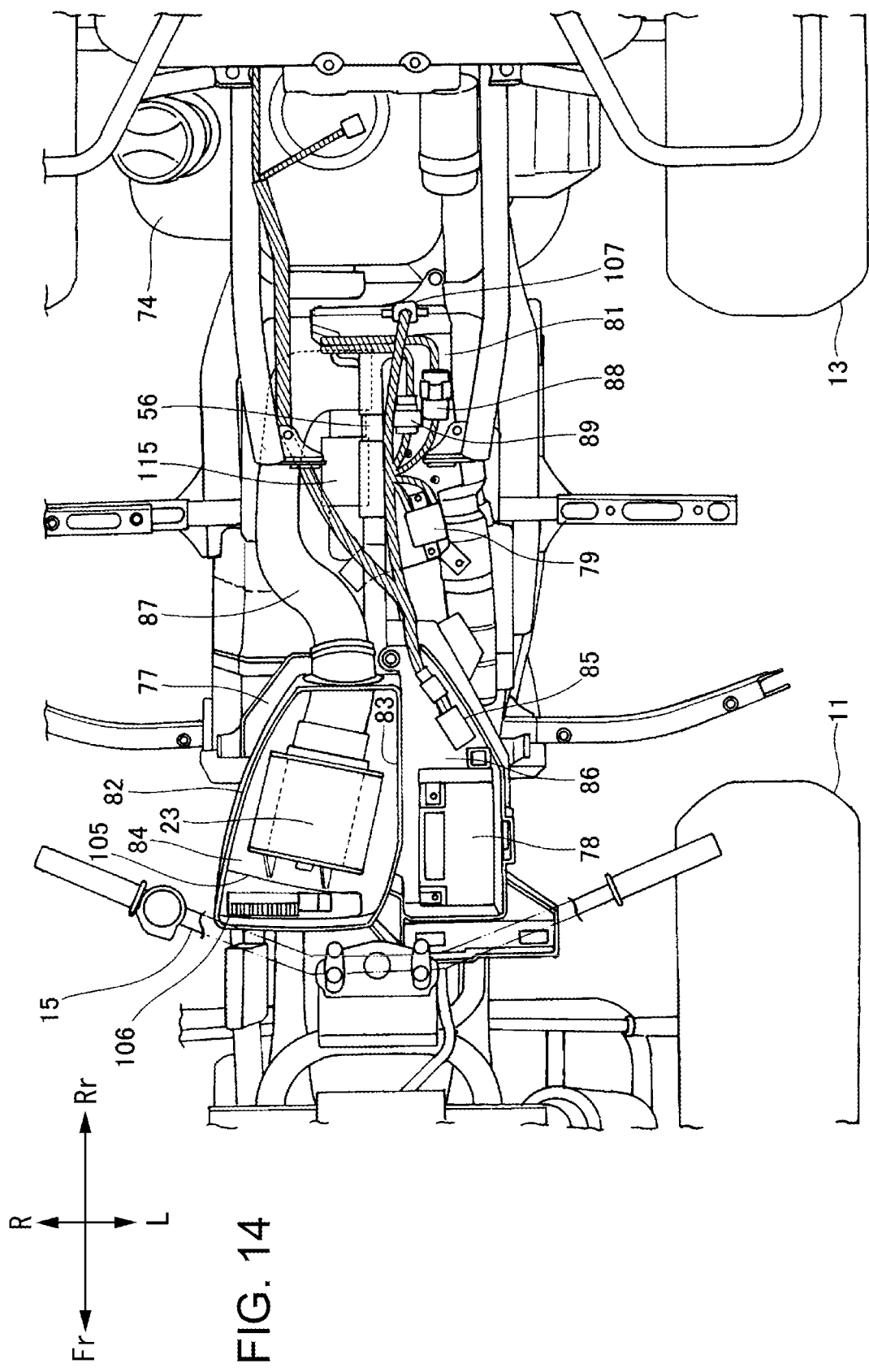
FIG. 14 is a layout diagram of an auxiliary-component supporting portion and an electric equipment-supporting portion.

As shown in FIG. 14, the plate-shaped auxiliary-component-supporting portion 77 is arranged on the upper frame section 56 at the vehicle rearward position relative to the steering handlebar 15. An air cleaner and battery storage box 82 is arranged on the auxiliary component supporting portion 77. The air cleaner and battery storage box 82 is narrowed down in a triangular-shape in such a manner that the width of a vehicle rearward side thereof is narrowed toward the vehicle rearward direction. It is narrowed down in the triangular-shape, to thereby obtain a foot rest space for the rider.

Moreover, the air cleaner and battery storage box 82 is partitioned into left and right sections by a partition wall 83 which extends in the vehicle body longitudinal direction. The right section serves as an air cleaner storage portion 84 to store the air cleaner 23 and the left section serves as an electric equipment storage portion 86 to store the battery 78 and a small electric equipment 85 arranged at the vehicle rearward side relative to the battery 78. That is, the air cleaner storage portion 84 and the battery 78 are separated to the left and right relative to the upper frame section 56 and a good weight balance is maintained.

Namely, the air cleaner and battery storage box 82 is a single integral box but is partitioned, whereby it is configured as a multiple functional box to store the air cleaner 23, the battery 78, and the small electric equipment 85.

A connecting tube 87 is extended from the air cleaner 23 to the right side of the single upper frame section 56 in the vehicle width direction. The upper frame section 56 is arranged at the center in the vehicle width direction.

Moreover, the plate-shaped electric-equipment-supporting portion 81 is carried on the rear portion of the single upper frame section 56. An ignition coil 79, an ACG (for an alternating current generator) couple 88, a change switch coupler 89, a bank angle sensor 107, etc. are carried on the plate-shaped electric-equipment-supporting portion 81.

Figure 15:
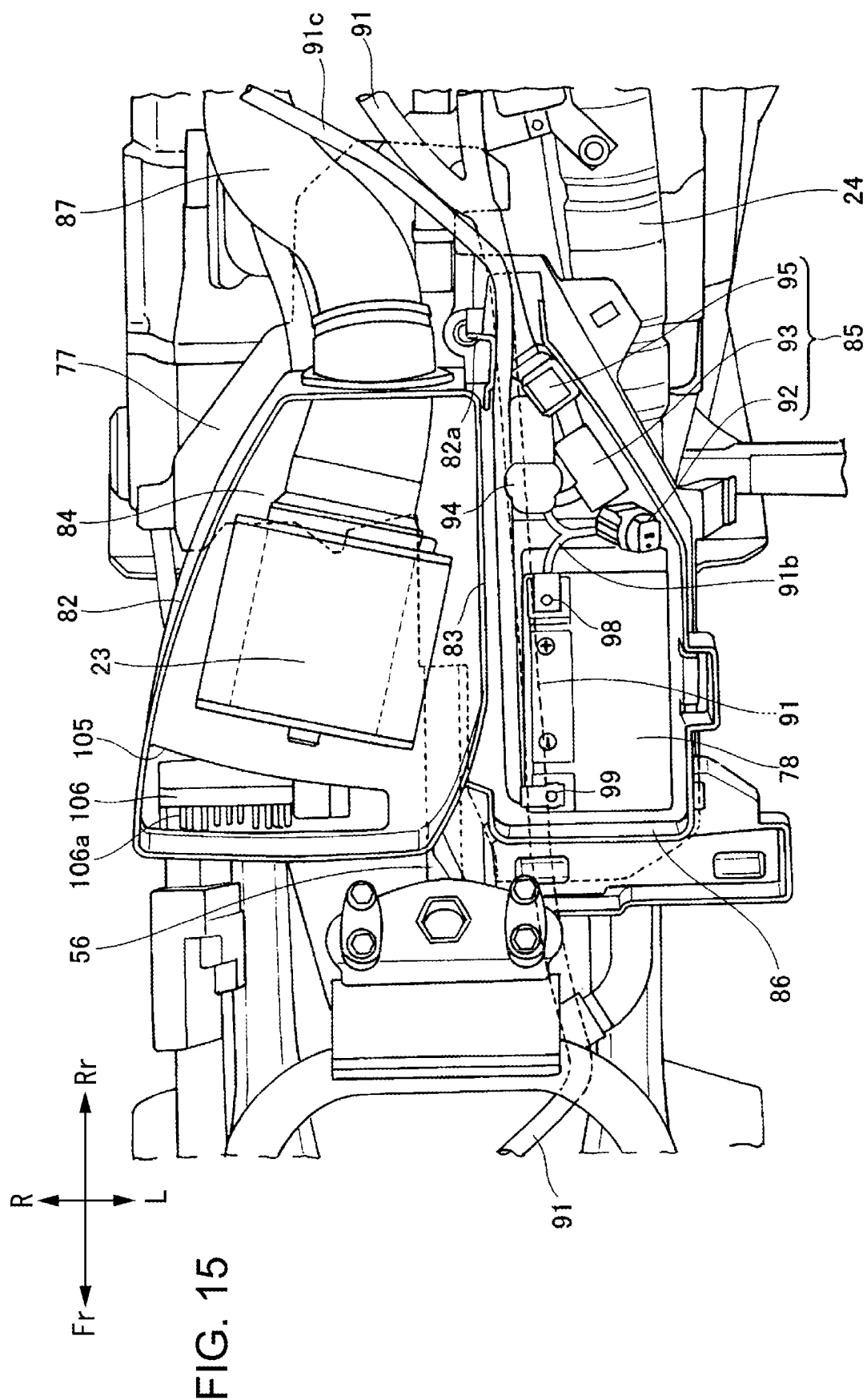
FIG. 15 is an explanatory view of the auxiliary component supporting portion.

As shown in FIG. 15, a main harness 91 passes under the electric equipment storage portion 86 and extends in the vehicle body forward/rearward direction.

The battery 78 is arranged in the electric equipment storage portion 86 and the small electric equipment 85 is arranged behind the battery 78.

The small electric equipment including, for example, an EPS fuse 92, a main fuse box 93 arranged in the vehicle rearward direction relative to the EPS fuse 92, a starter magnet switch 94 arranged on the right side of the main fuse box 93 in the vehicle width direction, and a fuel pump relay 95 arranged at a vehicle rearward side of the main fuse box 93.

An inlet port 105 is provided at the front portion of the air cleaner storage potion 84 of the air cleaner and battery storage box 82. A regulator 106 is arranged below this inlet port 105. Heat radiating fins 106a of the regulator 106 are provided in a vertically extending manner. Since a longitudinal direction of the heat radiating fin 106a coincides with an intake air flow direction, it is possible to reduce intake air resistance and improve heat radiating efficiency.

Moreover, the air cleaner and battery storage box 82 is fasten-fixed to the upper frame section 56 by the lower portion and the rear end portion 82a of the battery 78.

Moreover, a plus terminal 98 of the battery 78, the EPS fuse 92, and the starter magnet switch 94 are associated with one another by a harness 91b, and a harness 91c which extends in the vehicle longitudinal direction is connected to a minus terminal 99 of the battery 78.

Next, the form of the air cleaner and battery storage box 82 will be explained with reference to the left side view and the right side view.

Figure 16:
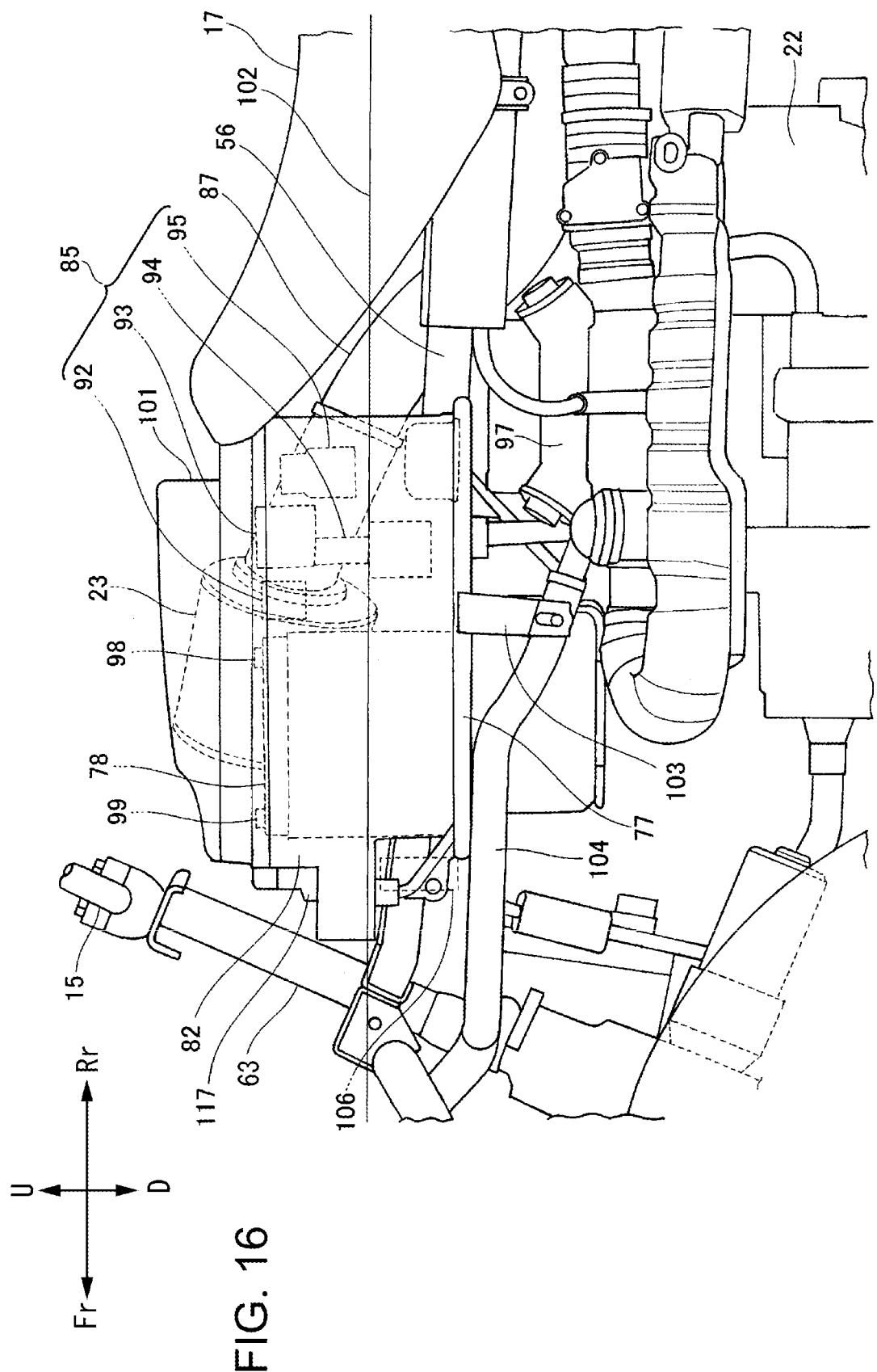
FIG. 16 is a left side view of a vehicle front portion according to the present invention.

As shown in FIG. 16, the plate-shaped auxiliary-component-supporting portion 77 is carried on the upper frame section 56, and the air cleaner and battery storage box 82 is carried on the auxiliary component supporting portion 77.

The battery 78 together with the air cleaner 23 is stored in the air cleaner and battery storage box 82. The battery 78 is arranged in the vehicle rearward direction relative to the steering shaft 63, in the forward direction relative to the seat 17, in the forward direction relative to a cylinder 97 of the power generation device 22, and on the left side of the air cleaner 23 in the vehicle width direction (FIG. 16).

The plus terminal 98 and the minus terminal 99 of the battery 78 are arranged at the upper portion of the air cleaner and battery storage box 82, that is, in vicinity of a lid 101.

Moreover, the small electric equipment 85 is arranged in the air cleaner and battery storage box 82. Namely, the small electric equipment 85 is composed of the EPS fuse 92, the main fuse box 93 arranged in the vehicle rearward direction relative to the EPS fuse 92, the starter magnet switch 94 arranged below the main fuse box 93, and the fuel pump relay 95 arranged in vehicle rearward direction of the main fuse box 93.

Figure 17:
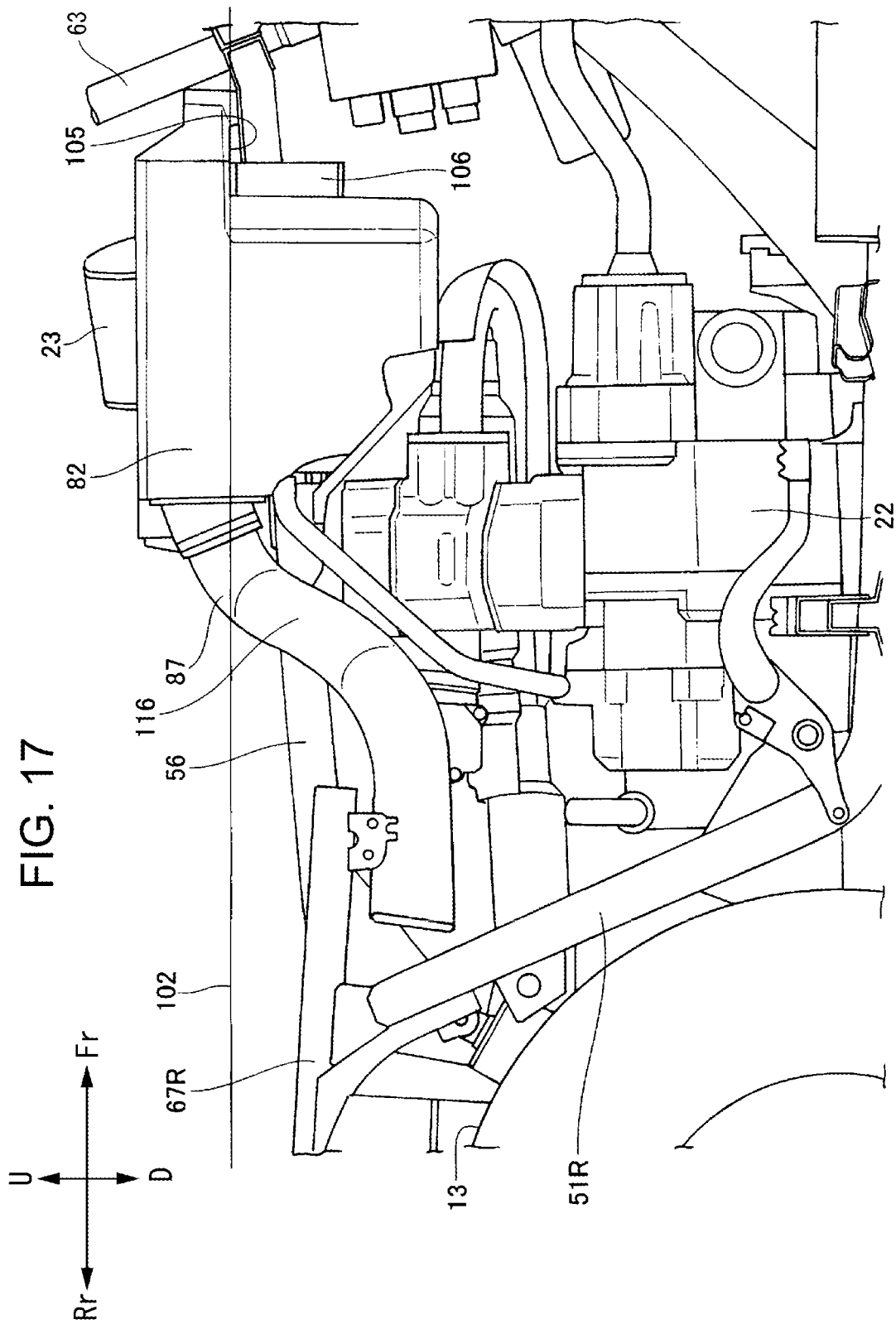
FIG. 17 is a right side view of the vehicle front portion according to the present invention.

A flood upper limit line 102 is set at a position in vicinity of a middle portion between the lower end of the lid 101 and the auxiliary component supporting portion 77 below the lower end of the lid. Incidentally, the flood upper limit line 102 is set at the lower end of the inlet port 105 (FIGS. 15 and 17).

The plus terminal 98 and the minus terminal 99 of the battery 78 and the most of the small electric equipment 85 are arranged above the flood upper limit line 102. Accordingly, waterproofing can be enhanced and the electric equipments including the battery 78 can be composed of non-waterproofing types of components.

Moreover, a hose stay 103 is extended downward from the auxiliary component supporting portion 77 and a radiator hose 104 is supported by the hose stay 103. Moreover, an ECU 117 (FIG. 6) is arranged at the air cleaner and battery storage box 82.

In many conventional vehicles, since the battery is arranged under the seat 17 and a distance between vicinity of the engine at which, particularly, electric equipments such as a sensor, etc. are easy to be collectively arranged, and the battery is increased, harnesses are likely to be lengthened. However, in the illustrative embodiment, since the battery 78 is arranged in vicinity of the engine 22, the harnesses can be shortened. Moreover, the small electric equipment 85 can be also arranged in vicinity of the engine 22, the harnesses including the small electric equipment 85 can be shortened.

Moreover, in the illustrative embodiment, since the battery 78 is also stored in the case (air cleaner and battery storage box 82) which stores the air cleaner 23, a battery storage case can be omitted. Moreover, since the battery 78 and the air cleaner 23 are arranged forward relative to the cylinder of the engine 22, they can be hard to be affected by the heat in the engine 22, and mud, dirt, etc. which will be caught by the rear wheel are more and more hard to enter the air cleaner 23 and this is thus preferable.

Moreover, as apparent from FIG. 14, since the air cleaner 23 is arranged on one side of the vehicle body center and the battery 78 is arranged on the other side, a left/right weight balance becomes easy to be taken.

As shown in FIG. 17, the air cleaner and battery storage box 82 is provided with the intake port 105 at the vehicle forward side thereof (right side in FIG. 17). The regulator 106 is arranged below the intake port 105. Intake air is struck directly against the regulator 106, to thereby exhibit a cooling effect.

Moreover, since the intake port 105 is provided at the front side of the air cleaner and battery storage box 82, mud or dirt caught by the rear wheel 13 is more and more hard to enter the box and this is thus preferable.

The regulator 106 is fasten-fixed to a boss that is provided on a front wall surface of the air cleaner and battery storage box 82.

Next, the arrangement of the small electric equipment 85 will be explained.

Figure 18:
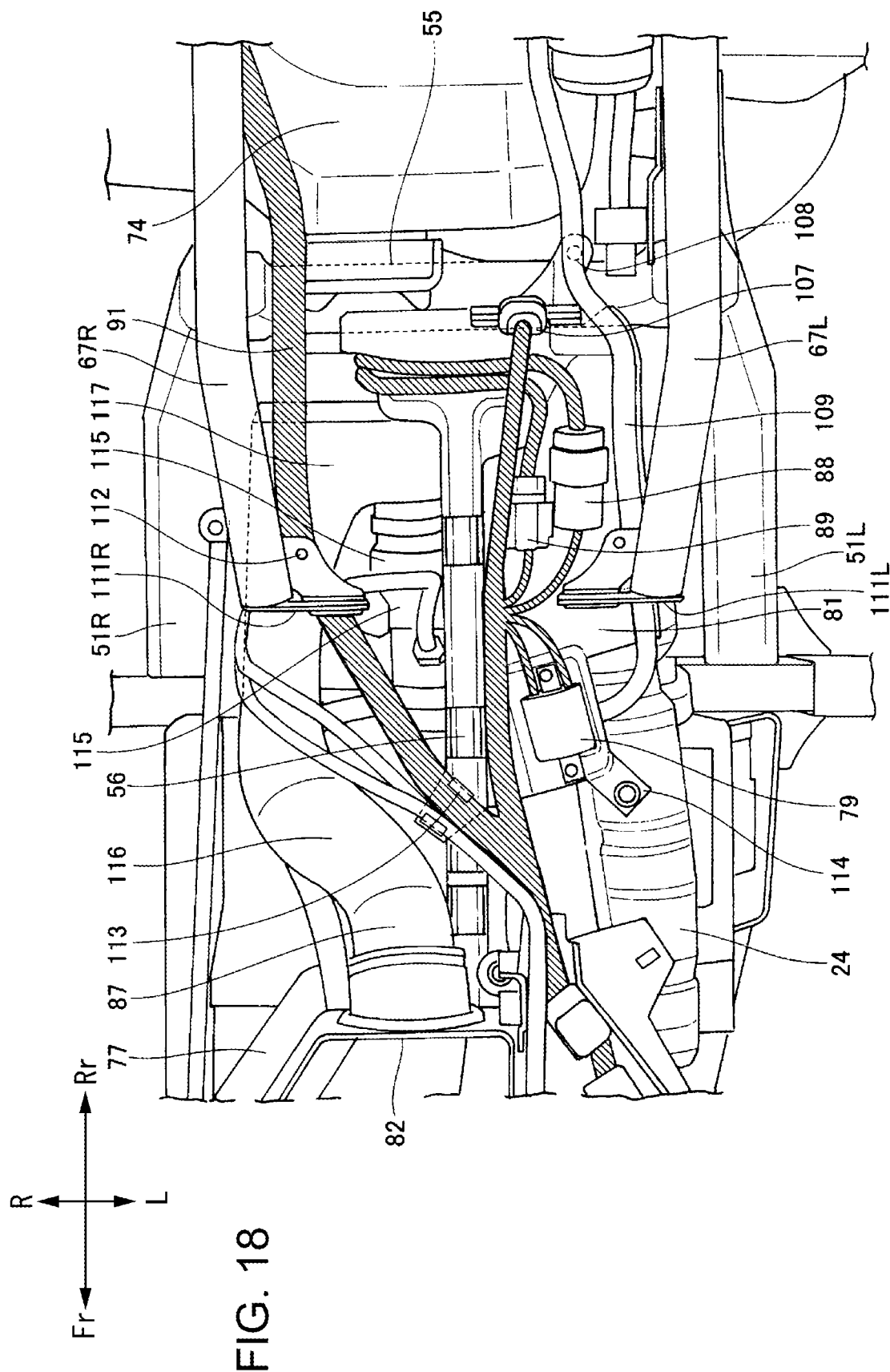
FIG. 18 is an enlarged view of the electric equipment-supporting portion.

As shown in FIG. 18, the electric equipment-supporting portion 81 is carried on the upper frame section 56 which is positioned at the center in the left/right direction of the vehicle body. The ignition coil 79, the ACG coupler 88, the change switch coupler 89, the bank angle sensor 107, etc., are carried on the plate-shaped electric-equipment-supporting portion 81.

Incidentally, the rear portion of the plate-shaped electric-equipment-supporting portion 81 is supported by the stay 108 of the fuel tank 74. A fuel hose 109 which extends from the fuel tank 74 is supported by a guide portion provided at a left edge of the electric equipment-supporting portion 81, and extends in the vehicle forward direction.

The fuel hose 109 is supported by the electric equipment-supporting portion 81. If the supported region is the left side in the vehicle width direction relative to the upper frame section 56, the main harness 91 is arranged at the right side in the vehicle width direction. The fuel hose 109 and the main harness 91 are arranged at the left and right relative to the upper frame section 56, with appropriate balance.

Moreover, seat catchers 111L, 111R are provided at the front ends of the rear pipes 67L, 67R. The main harness 91 is supported on the right seat catcher 111R by a clip 112. Moreover, the main harness 91 is supported, through a stay 113, on the electric equipment-supporting portion 81 at a position in vicinity of the ignition coil 79. The stay 113 is obliquely provided by rotating it in a counterclockwise direction relative to a vehicle body longitudinal axis in such a manner that the main harness 91 faces the right rear pipe 67R. Accordingly, it is possible to smoothly displace the thick main harness 91 in the vehicle width direction.

Moreover, the fuel tank 74 is arranged behind the electric equipment supporting 81 in the vehicle rearward direction. It is possible to wire the harness at a position separated from the fuel tank 74, and workability is enhanced.

Moreover, the rear portion of the electric equipment-supporting portion 81 spreads in the vehicle width direction so as to cover a joined portion between the second cross portion 55 and the rear portion of the upper frame section 56, and also, so as to extend along the second cross portion 55.

In the illustrative embodiment, on this spreading region, a harness extending from the rear surface of the AGC coupler 88, and a harness extending from the rear surface of the change switch coupler 89 are carried. The joined region between the second cross portion 55 and the rear portion of the upper frame section 56 is subjected to welding, whereby burrs and projections are easy to be produced.

However, when the joined region is covered with the rear portion of the electric equipment-supporting portion 81, there is no fear that the harnesses, the electric equipments, etc. are damaged by the burrs and the projections.

Further, the plate-shaped electric-equipment-supporting portion 81 is extended in the vehicle forward direction relative to the rear pipe 67L, and the main harness 91 is supported by the front end of the rear pipe 67R and the front end of the electric equipment-supporting portion 81. If the main harness 91 is intended to be wired outward of the vehicle width from the center in the vehicle width direction while being bent in a crank-shape, not only a harness length is lengthen but also the main harness is hard to be bent since the main harness is a relatively thick harness, and assembly is poor. However, in the illustrative embodiment, the above-mentioned structure ensures a good assembly while allowing the main harness 91 to be firmly supported.

Moreover, a cover stay portion 114 to which the vehicle body cover is attached is provided at a left region of the front portion of the electric equipment-supporting portion 81.

That is, the electric equipment-supporting portion 81 also performs the role in supporting the vehicle body cover.

Also, the connecting tube 87 extends in the vehicle rearward direction from the air cleaner and battery storage box 82, but firstly descends while being curved to the left in the vehicle width direction at a bent descending portion 116 thereof, next extends in the vehicle rearward direction so as to pass laterally of a throttle body 115 arranged on the vehicle body center side, and subsequently bent to the vehicle body center side at a turn portion 117 of about 90°, and inserted at the tip end thereof into the lower portion of the upper frame section 56. The turn portion 117 is formed in a large-diameter, thus decreasing a passage resistance. Namely, the connecting tube 87 is formed so as to exhibit a substantially J-shape as viewed in the plan view and is wound so as to surround the throttle body 115.

Moreover, as shown in FIG. 6, the electric equipment-supporting portion 81 is configured so as to be supported directly by the upper frame section 56 and, at the same time, is provided with a step portion which is formed at a position lower than the upper end of the upper frame section 56. The electric equipments such as the ignition coil 79, etc. are adapted to be stored on this step.

Moreover, as shown in FIG. 18, the connecting tube 87 and the throttle body 115 are arranged at one side (in this example, the right side in the vehicle width direction) relative to the upper frame section 56, and the electric equipment-supporting portion 81 is arranged at the other side (in this example, the left side in the vehicle width direction), so that the available use of spaces can be realized and, at the same time, the maintainability of the throttle body 115 can be enhanced since the throttle body 115 is not obstructed by the electric equipment-supporting portion 81.

Further, the exhaust pipe 24 is arranged below the plate-shaped electric-equipment-supporting portion 81. Since the electric equipment-supporting portion 81 performs the role of a heat insulator, the ignition coil 79, the ACG coupler 88, and the change switch coupler 89 are thermally protected.

Figure 19:
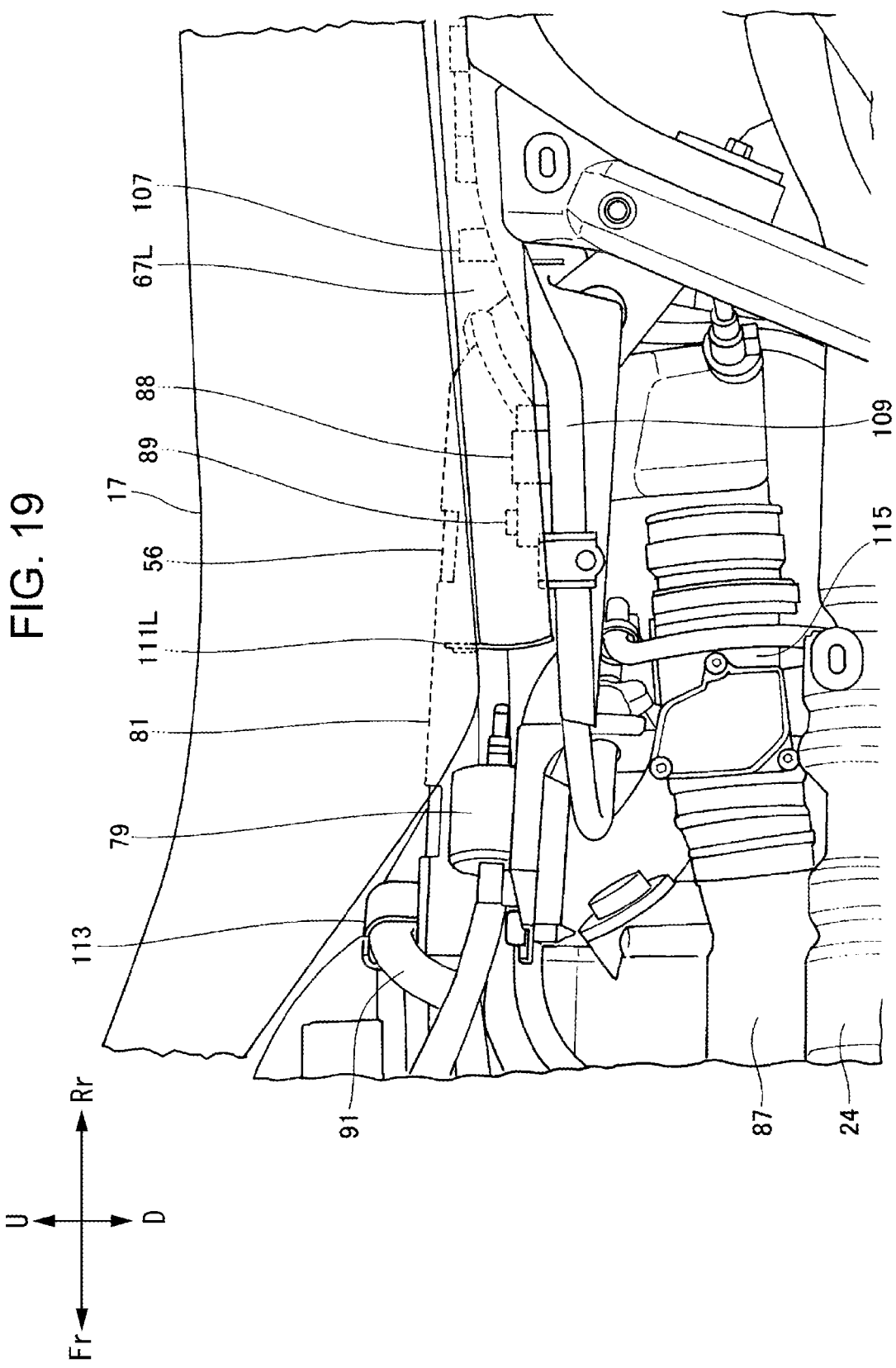
FIG. 19 is a left side view of a vehicle middle portion.
Figure 20:
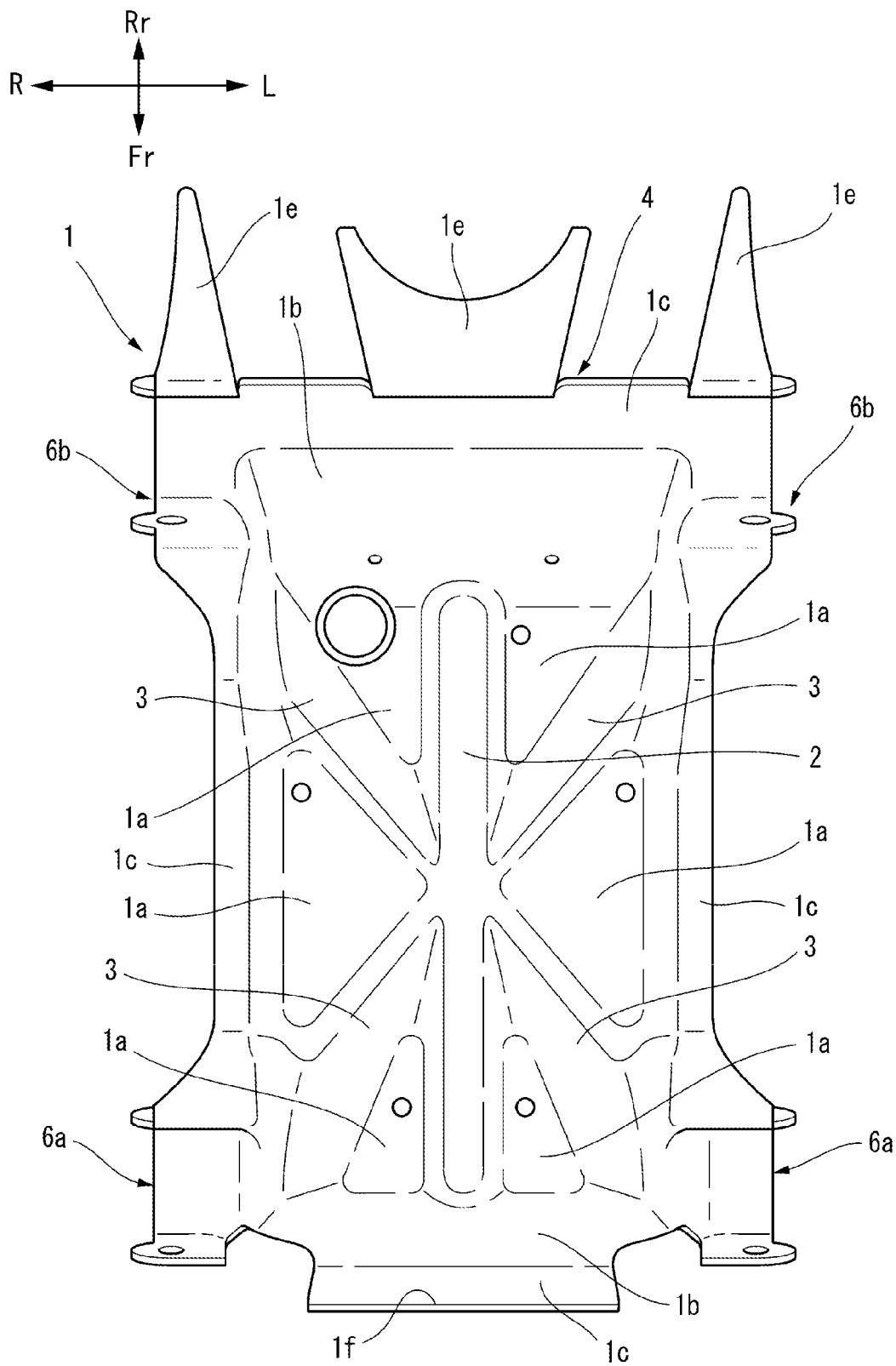
FIG. 20 is a bottom view of the suspension-supporting bracket, in a single component state (in a state prior to being installed in the vehicle body frame), according to the present invention.
Figure 21:
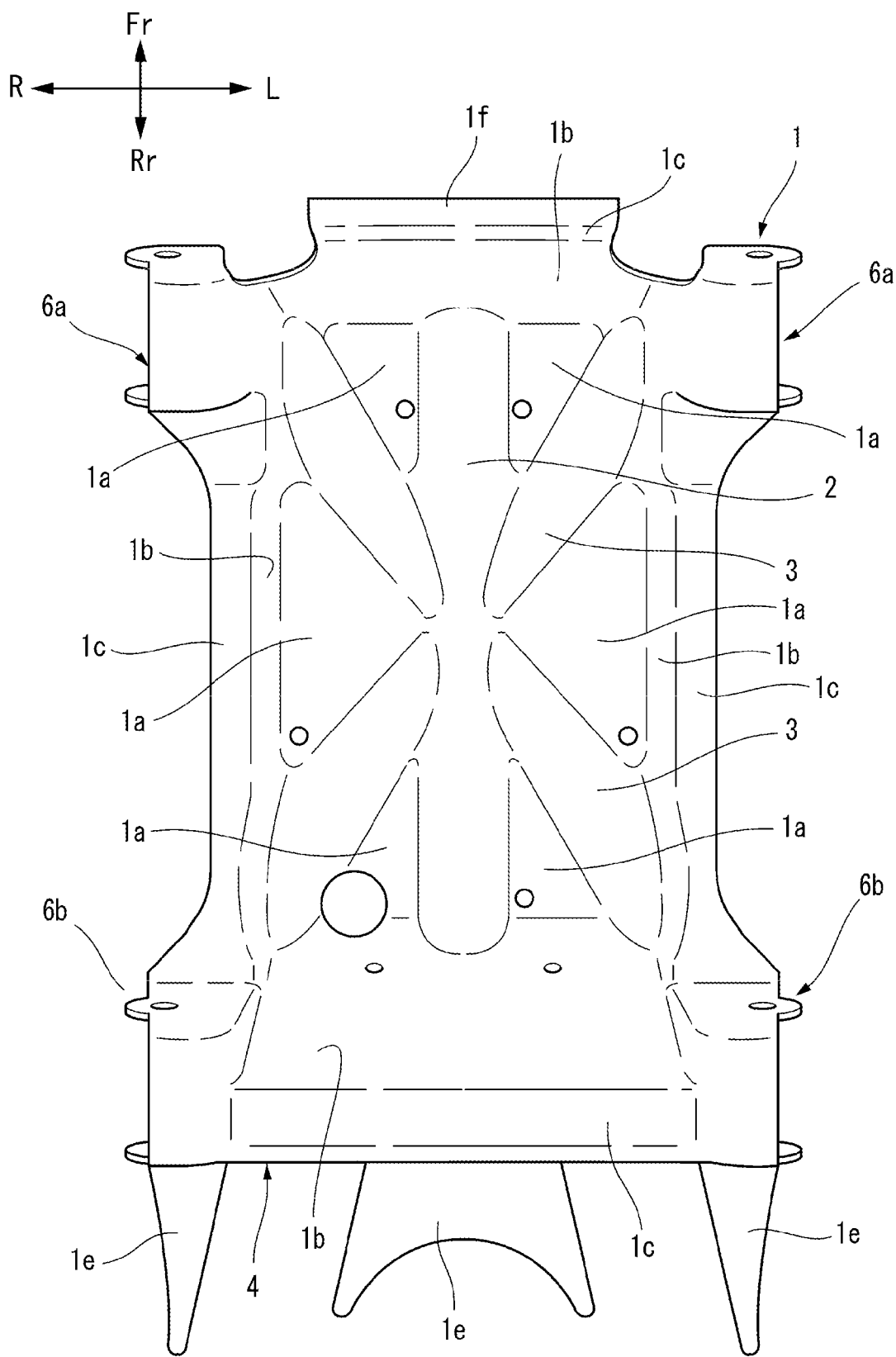
FIG. 21 is a plan view of the suspension-supporting bracket, in the single component state, according to the present invention.
Figure 22:
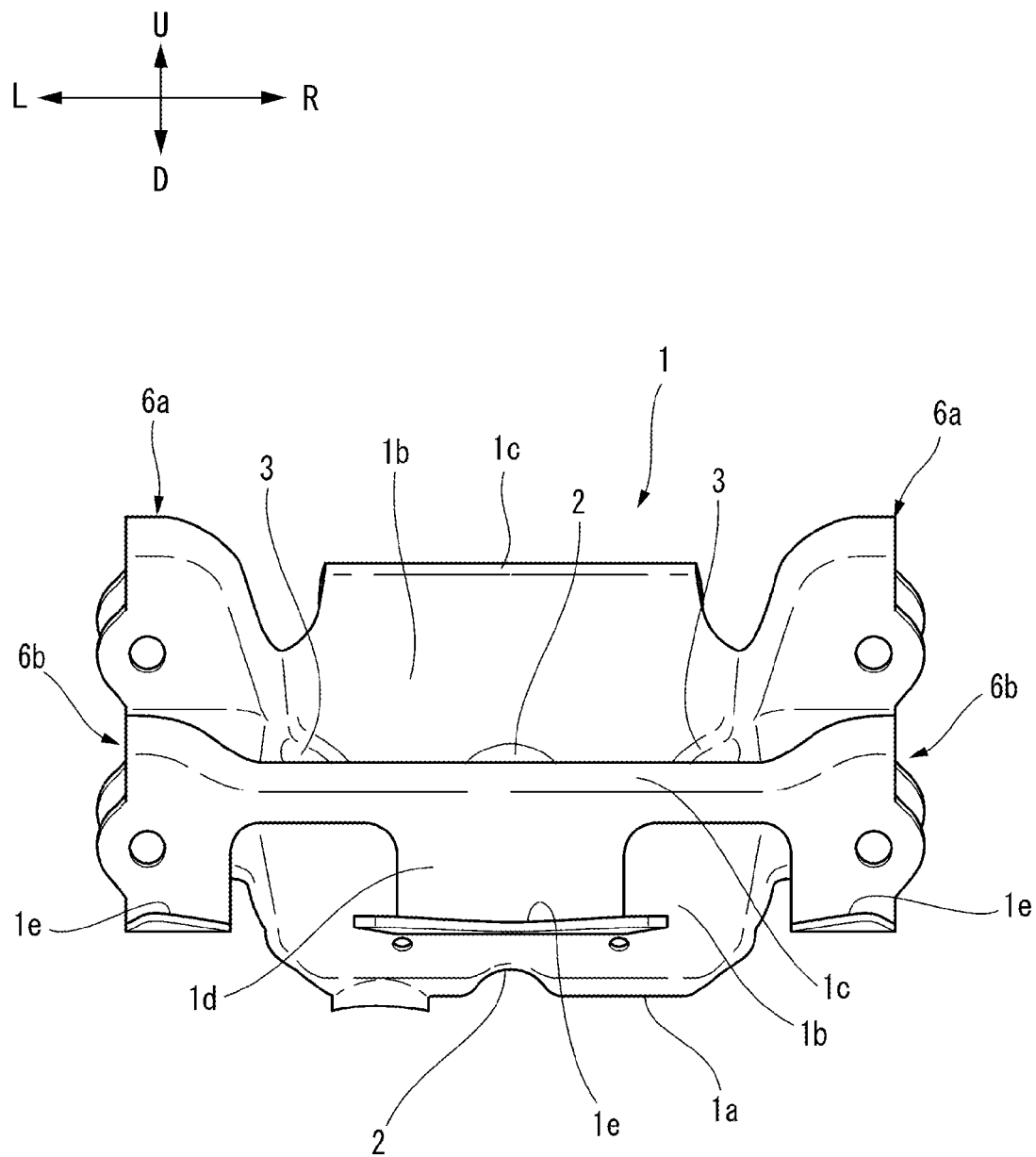
FIG. 22 is a rearward perspective view of the suspension-supporting bracket, in the single component state, according to the present invention.

As shown in FIG. 19, the seat catcher 111L is provided at the front end of the rear pipe 67L and the seat 17 is supported by the seat catcher 111L.

Moreover, since the ignition coil 79, the ACG coupler 88, and the change switch coupler 89 are arranged lower than the upper surface of the upper frame section 65, there is no fear that they are not subjected to downward applying load of the seat 17.

Further, since the ACG coupler 88, the change switch coupler 89, the bank angle sensor 107, and the fuel hose 109 are arranged at positions at which they are overlapped on the rear pipe 67L, the fear that the downward applying load of the seat 17 is applied to them is more reduced and, in addition, the protecting effect of these electric equipments can be enhanced. Moreover, the electric equipment-supporting portion 81 is effectively provided in a narrow space below the seat and the electric equipments can be arranged in the space.

Moreover, the main harness 91 is supported at the front of the electric equipment-supporting portion 81 by the stay 113. The throttle body 115 is arranged below the electric equipment-supporting portion 81 and the exhaust pipe 24 is arranged below the throttle body 115.

While the embodiment of the present invention has been explained above, the present invention is not limited to the above-mentioned embodiment and various changes can be made to the embodiment. For example, the size and the number of the forward/rearward concaved portion 2 and the diagonally concaved portions 3, 3 are not limited to those in the above-mentioned embodiment. Moreover, the orientation of the concave direction and the shape can also be suitably changed.

Incidentally, while the vehicle body frame structure of the present invention is suitable for a small-sized vehicle, particularly, an All-terrain vehicle, it may be applied to a general vehicle.

Although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. A vehicle comprising:
   a vehicle body frame;
   an engine operatively attached to the vehicle body frame and operable to generate power; and
   a power transmission unit for transmitting power from the engine to wheels of the vehicle;
   wherein the vehicle body frame comprises:
   a plurality of main frame sections extending in a longitudinal direction of the vehicle at a lower portion of the vehicle body frame;
   a plurality of front frame sections extending vertically at a front portion of the vehicle body frame; and
   a suspension-supporting bracket arranged between said main frame sections and said front frame sections and having a plurality of suspension arm-supporting portions thereon for supporting left and right suspension arms, respectively, said plurality of suspension arm-supporting portions comprising a front suspension arm-supporting portion and a rear suspension arm-supporting portion, wherein the suspension-supporting bracket comprises a main plate member having a pair of diagonally oriented concave portions formed thereon and extending along intersecting diagonal lines, and wherein the front and rear suspension arm-supporting portions are formed integrally with the main plate member on left and right sides thereof, respectively, and are joined to front end portions and lower end portions of the front frame sections.

2. The vehicle according to claim 1, wherein the suspension-supporting bracket comprises
   a bottom wall portion;
   a plurality of side wall portions which are formed integrally with, and extend upwardly from outer edges of said bottom wall portion; and
   a flange portion bent outwardly on the bracket relative to a wall surface of the side wall portions.

3. The vehicle according to claim 2, wherein the suspension-supporting bracket comprises:
   a longitudinally extending concave portion formed thereon and extending in a longitudinal direction proximate a vehicle body center line, and
   said diagonally oriented concave portions extending diagonally thereon;
   wherein the suspension arm-supporting portions are formed in the bottom wall portion so as to each have concave shape, as viewed in a bottom view of the bracket; and
   wherein the suspension arm-supporting portions are arranged at left and right sides of a front end of the bracket and at left and right sides of a rear end of the bracket, respectively.

4. The vehicle according to claim 2, wherein the front frame sections are abuttingly joined to the flange portion, side wall portions, and front suspension arm-supporting portions of the suspension-supporting bracket.

5. The vehicle according to claim 2, wherein the flange portion has a portion bent downwardly thereon at a front end thereof.

6. The vehicle according to claim 2, wherein the flange portion comprises:
   a rear end bent portion bent downwardly at a rear end thereof, and
   a rearwardly-extending portion extending further rearwardly from the rear end bent portion, said rearwardly-extending portion formed with a downward facing U-shaped portion which opens downward as viewed in a side view, and the rear suspension arm-supporting portion is provided so as to be continued to the downward facing U-shaped portion.

7. The vehicle according to claim 1, wherein the suspension-supporting bracket comprises:
   a longitudinally extending concave portion formed thereon and extending in a longitudinal direction proximate a vehicle body center line, and
   said diagonally oriented concave portions extending diagonally thereon;
   wherein the suspension arm-supporting portions are formed in the bottom wall portion so as to each have a concave shape, as viewed in a bottom view of the bracket; and
   wherein the suspension arm-supporting portions are arranged at left and right sides of a front end of the bracket and at left and right sides of a rear end of the bracket.

8. The vehicle according to claim 7, wherein the diagonally oriented concave portions are configured such that sizes of recesses thereof are gradually increased from a substantially center portion of the suspension-supporting bracket toward an outside of the bracket.

9. The vehicle according to claim 8, wherein the front frame sections are abuttingly joined to the flange portion, side wall portions, and front suspension arm-supporting portions of the suspension-supporting bracket.

10. The vehicle according to claim 8, wherein the flange portion has a portion bent downwardly thereon at a front end thereof.

11. The vehicle according to claim 8, wherein the flange portion comprises
   a rear end bent portion bent downwardly at a rear end thereof, and
   a rearwardly-extending portion extending further rearwardly from the rear end bent portion, said rearwardly-extending portion formed with a downward facing U-shaped portion which opens downward as viewed in a side view, and the rear suspension arm-supporting portion is provided so as to be continued to the downward facing U-shaped portion.

12. The vehicle according to claim 7, wherein the front frame sections are abuttingly joined to the flange portion, side wall portions, and front suspension arm-supporting portions of the suspension-supporting bracket.

13. The vehicle according to claim 7, wherein the flange portion has a portion bent downwardly thereon at a front end thereof.

14. The vehicle according to claim 7, wherein the flange portion comprises:
a rear end bent portion bent downwardly at a rear end thereof, and
a rearwardly-extending portion extending further rearwardly from the rear end bent portion, said rearwardly-extending portion formed with a downward facing U-shaped portion which opens downward as viewed in a side view, and the rear suspension arm-supporting portion is provided so as to be continued to the downward facing U-shaped portion.

15. The vehicle according to claim 1, wherein the main plate member comprises
a bottom wall portion; and
a plurality of side wall portions which are formed integrally with, and extend upwardly from outer edges of said bottom wall portion;
wherein said suspension-supporting bracket further comprises a flange portion bent outwardly on the bracket relative to a wall surface of one of the side wall portions; and
wherein the flange portion comprises:
a rear end bent portion bent downwardly at a rear end thereof, and
a rearwardly-extending portion extending further rearwardly from the rear end bent portion,
said rearwardly-extending portion formed with a downward facing U-shaped portion which opens downward as viewed in a side view, and wherein the rear suspension arm-supporting portion is provided so as to be continued to the downward facing U-shaped portion.

16. The vehicle according to claim 15, wherein forward end portions of the main frame sections pass the rearwardly-extending portion and the downward facing U-shaped portion from the rear end bent portion, extend to the side wall portion and are joined to the side wall portion.

17. A suspension-supporting bracket configured to be installed between main frame sections and front frame sections of a vehicle body frame, said suspension-supporting bracket comprising:
a main plate member;
a plurality of suspension arm-supporting portions comprising a front suspension arm-supporting portion and a rear suspension arm-supporting portion; the front suspension arm-supporting portion and the rear suspension arm-supporting portion being formed integrally with left and right sides of the main plate member, and being joined to front end portions and lower end portions of the front frame sections;
a bottom wall portion;
a plurality of side wall portions which are formed integrally with, and extend upwardly from outer edges of said bottom wall portion;
a flange portion bent outwardly on the bracket relative to a wall surface of the side wall portion;
a longitudinally extending concave portion formed thereon extending longitudinally in the main plate member; and
a pair of diagonally oriented concave portions formed thereon and extending along intersecting diagonal lines;
wherein the suspension arm-supporting portions are formed in the bottom wall portion so as to each have concave shape, as viewed in a bottom view of the bracket.

18. A suspension-supporting bracket according to claim 17, wherein the flange portion comprises
a rear end bent portion bent downwardly at a rear end thereof, and
a rearwardly-extending portion extending further rearwardly from the rear end bent portion, said rearwardly-extending portion formed with a downward facing U-shaped portion which opens downward as viewed in a side view, and the rear suspension arm-supporting portion is provided so as to be continued to the downward facing U-shaped portion; and
wherein the diagonally concaved portions are configured in such a manner that sizes of recesses thereof are gradually increased from a substantially center portion of the suspension-supporting bracket toward an outside of the bracket.

19. In a vehicle body frame having a plurality of frame sections comprising main frame sections and front frame sections, the improvement comprising a suspension-supporting bracket arranged between said main frame sections and front frame sections; said suspension-supporting bracket comprising
a main plate member;
suspension arm-supporting portions formed integrally with left and right sides of the main plate member;
a bottom wall portion;
a side wall portion which is formed on a forward/rearward side and a left/right side by a peripheral portion thereof rising up relative to said bottom wall portion;
a flange portion bent outward of the bracket relative to a wall surface of the side wall portion;
a longitudinally extending concave portion formed thereon extending in a forward/rearward direction on a vehicle body center line; and
diagonally concaved portions formed thereon extending along intersecting diagonal lines;
wherein the suspension arm-supporting portions are formed in the bottom wall portion so as to each have concave shape, as viewed in a bottom view of the bracket.

20. A suspension-supporting bracket according to claim 19, wherein the flange portion comprises:
a rear end bent portion bent downwardly at a rear end thereof, and
a rearwardly-extending portion extending further rearwardly from the rear end bent portion, said rearwardly-extending portion formed with a downward facing U-shaped portion which opens downward as viewed in a side view, and the rear suspension arm-supporting portion is provided so as to be continued to the downward facing U-shaped portion; and
wherein the diagonally concaved portions are configured in such a manner that sizes of recesses thereof are gradually increased from a substantially center portion of the suspension-supporting bracket toward an outside of the bracket.

* * * * *